(12) United States Patent
Dunn et al.

(10) Patent No.: US 10,506,339 B2
(45) Date of Patent: *Dec. 10, 2019

(54) SMART PASSENGER SERVICE UNIT

(71) Applicant: B/E Aerospace, Inc., Wellington, FL (US)

(72) Inventors: Matthew Dunn, Stony Brook, NY (US); Eric Johannessen, Holbrook, NY (US); Gannon T. Gambeski, St. James, NY (US); John Terence Barker, Overland Park, KS (US); Ronnie R. Moss, Camano Island, WA (US); Jesse Richard Peck, Seattle, WA (US); Robert Linton, Bothell, WA (US); Jonathan Todzia, Farmingville, NY (US); Donald LaSala, Seaford, NY (US); Luis Sam, South Setauket, NY (US)

(73) Assignee: B/E Aerospace, Inc., Winston-Salem, NC (US)

( * ) Notice: Subject to any disclaimer, the term of this patent is extended or adjusted under 35 U.S.C. 154(b) by 335 days.

This patent is subject to a terminal disclaimer.

(21) Appl. No.: 15/476,785

(22) Filed: Mar. 31, 2017

(65) Prior Publication Data

US 2017/0203856 A1    Jul. 20, 2017

Related U.S. Application Data

(63) Continuation-in-part of application No. 14/869,651, filed on Sep. 29, 2015, now Pat. No. 10,219,059.

(Continued)

(51) Int. Cl.
*H04R 3/04* (2006.01)
*H04R 1/02* (2006.01)
(Continued)

(52) U.S. Cl.
CPC ........... *H04R 3/04* (2013.01); *B64D 11/0015* (2013.01); *B64D 11/00155* (2014.12);
(Continued)

(58) Field of Classification Search
CPC .................. H04R 3/04; H04R 2499/13; H04R 2201/028; H04R 1/28; H04R 3/12;
(Continued)

(56) References Cited

U.S. PATENT DOCUMENTS 4,158,400 A    6/1979  Vice
5,980,057 A   11/1999  Christie
(Continued)

OTHER PUBLICATIONS

Non-Final Office Action for U.S. Appl. No. 14/869,651 dated Aug. 17, 2017. 22 pages.
(Continued)

*Primary Examiner* — Brian Wilson
(74) *Attorney, Agent, or Firm* — Suiter Swantz pc llo

(57) ABSTRACT

In an illustrative embodiment, an integrated speaker-light unit includes a base unit adapted to be mounted to a fixture of an aircraft, a speaker unit disposed proximate the base unit, a horn element having a proximal end and a distal end, the proximal end positioned proximate the speaker unit and defining a first aperture, and the distal end defining a second aperture, where a greatest measurement of the second aperture is larger than a greatest measurement of the first aperture, an LED unit disposed at least partially in the horn element, and a housing element at least partially surrounding the horn element. The greatest measurement of the second aperture may be less than 4 inches. The base unit may be mounted to a passenger service unit such that the integrated speaker-light unit is presented as a passenger reading light.

18 Claims, 41 Drawing Sheets

Related U.S. Application Data

(60) Provisional application No. 62/057,133, filed on Sep. 29, 2014, provisional application No. 62/133,123, filed on Mar. 13, 2015, provisional application No. 62/173,855, filed on Jun. 10, 2015.

(51) Int. Cl.
| | | |
|---|---|---|
| *H04R 3/12* | (2006.01) | |
| *B64D 11/00* | (2006.01) | |
| *F21V 33/00* | (2006.01) | |
| *H04R 1/28* | (2006.01) | |
| *G10K 11/178* | (2006.01) | |
| *B64D 45/00* | (2006.01) | |

(52) U.S. Cl.
CPC ........ *F21V 33/0056* (2013.01); *G10K 11/178* (2013.01); *H04R 1/028* (2013.01); *H04R 1/28* (2013.01); *H04R 3/12* (2013.01); *B64D 2011/0053* (2013.01); *B64D 2045/007* (2013.01); *B64D 2231/025* (2013.01); *G10K 2210/1281* (2013.01); *G10K 2210/3044* (2013.01); *H04R 2201/028* (2013.01); *H04R 2499/13* (2013.01); *Y02T 50/46* (2013.01)

(58) Field of Classification Search
CPC .............. H04R 1/028; B64D 11/00155; B64D 11/0015; B64D 2231/025; B64D 2011/0053; B64D 2045/007; F21V 33/0056; Y02T 50/46; G10K 2210/3044; G10K 2210/1281; G10K 11/178
See application file for complete search history.

(56) References Cited

U.S. PATENT DOCUMENTS

| | | | |
|---|---|---|---|
| 6,177,887 B1 | 1/2001 | Jerome | |
| 6,371,637 B1 | 4/2002 | Atchinson et al. | |
| 6,393,343 B1 * | 5/2002 | Frey | B64D 11/00 244/118.5 |
| 6,813,777 B1 * | 11/2004 | Weinberger | H04B 7/18508 348/E5.008 |
| 6,998,538 B1 | 2/2006 | Fetterolf et al. | |
| 7,692,099 B2 | 4/2010 | Burke | |
| 7,784,957 B2 | 8/2010 | Wright | |
| 8,300,869 B2 | 10/2012 | Marlin et al. | |
| 8,806,543 B1 | 8/2014 | Curtis et al. | |
| 2005/0280014 A1 | 12/2005 | Park et al. | |
| 2007/0018181 A1 | 1/2007 | Steen et al. | |
| 2007/0107277 A1 | 5/2007 | Simms et al. | |
| 2009/0323334 A1 | 12/2009 | Roberts et al. | |
| 2010/0188778 A1 | 7/2010 | Castagna | |
| 2011/0216910 A1 | 9/2011 | Lee | |
| 2011/0255711 A1 | 10/2011 | Ivey et al. | |
| 2012/0230530 A1 * | 9/2012 | Schevardo | B64D 11/00 381/333 |
| 2012/0292986 A1 | 11/2012 | Riedel et al. | |
| 2012/0293342 A9 | 11/2012 | Stoll et al. | |
| 2012/0307487 A1 * | 12/2012 | Eckel | F21K 9/90 362/231 |
| 2013/0016864 A1 * | 1/2013 | Ivey | H04R 1/028 381/340 |
| 2013/0082984 A1 | 4/2013 | Drzaic et al. | |
| 2013/0105638 A1 | 5/2013 | Umlauft et al. | |
| 2013/0208490 A1 | 8/2013 | Savian | |
| 2015/0090839 A1 * | 4/2015 | Freund | B64D 11/0015 244/118.5 |
| 2015/0092429 A1 | 4/2015 | Speer et al. | |
| 2016/0053977 A1 | 2/2016 | Johannessen et al. | |
| 2016/0286318 A1 * | 9/2016 | Yuasa | F21V 33/0056 |

OTHER PUBLICATIONS

Search Report dated Aug. 8, 2018 for European Patent Application No. 15846009.7.

* cited by examiner

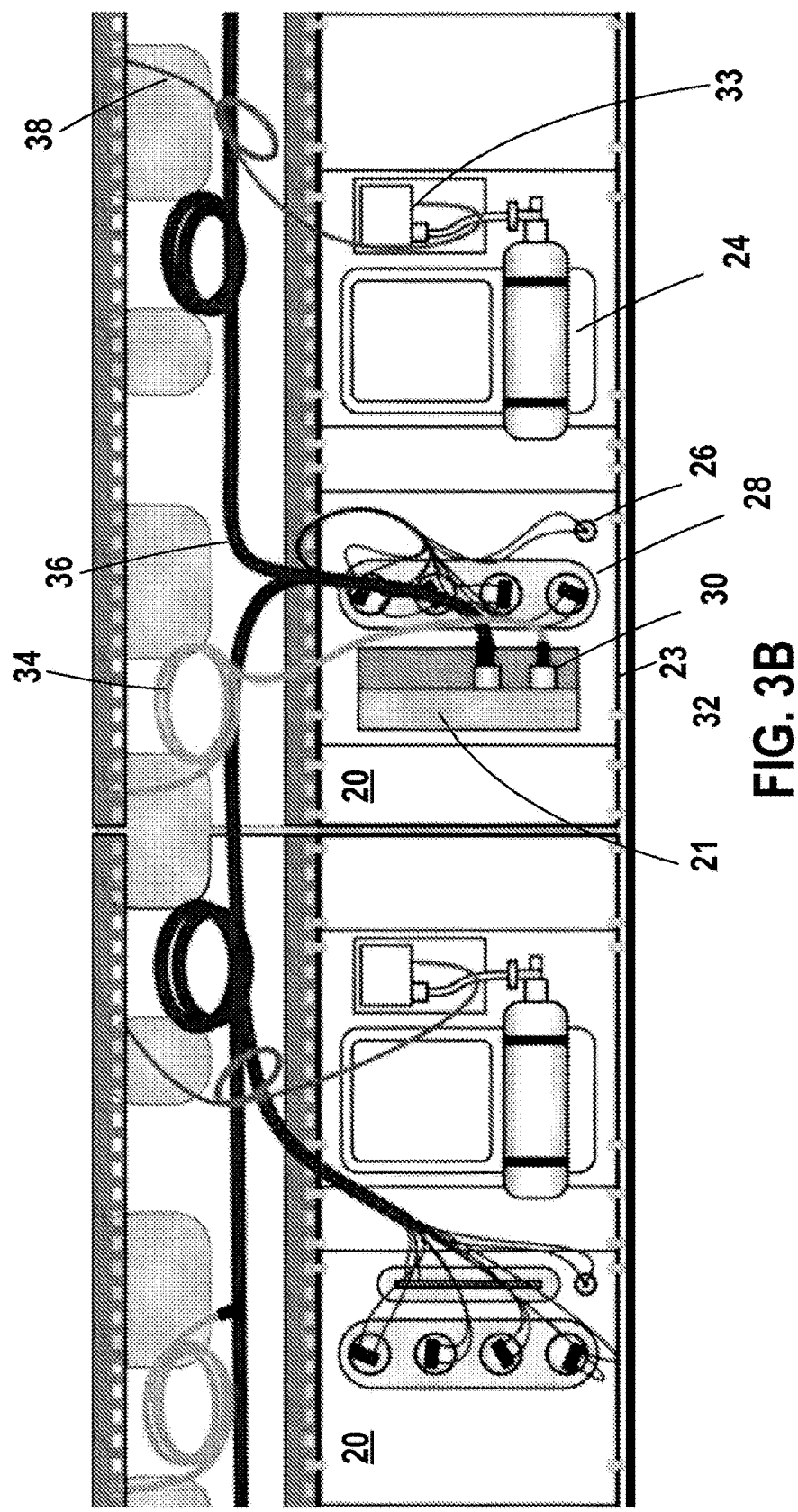

| Wire Counts for 4 PAX PSUs | | |
|---|---|---|
| Component | Example | Smart PSU |
| Lights | 8 | 0 |
| Ordinance | 6 | 0 |
| Attendant Call | 2 | 0 |
| Speaker | 2 | 2 |
| Power | 4 | 4 |
| Data | 0 | 4 |
| Total | 22 | 10 |
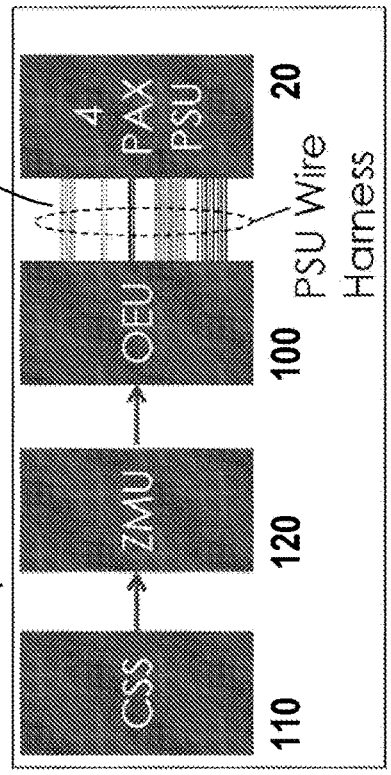
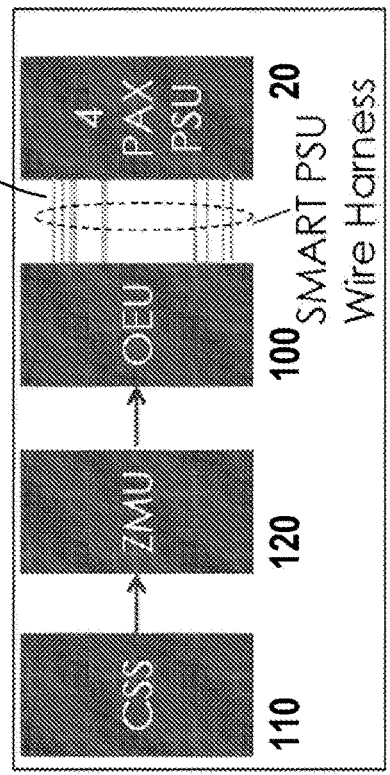
FIG. 6

SMART PASSENGER SERVICE UNIT

RELATED APPLICATIONS

This application is a continuation-in-part of and claims priority to U.S. patent application Ser. No. 14/869,651 entitled "Smart Passenger Service Unit," filed Sep. 29, 2015, which claims priority to the following applications: U.S. Provisional Patent Application Ser. No. 62/057,133 filed Sep. 29, 2014, U.S. Provisional Patent Application Ser. No. 62/133,123 filed Mar. 13, 2015, and U.S. Provisional Patent Application Ser. No. 62/173,855 filed Jun. 10, 2015. All above identified applications are hereby incorporated by reference in their entireties.

This application also incorporates by reference, in their entireties, the following applications by B/E Aerospace, Inc.: U.S. patent application Ser. No. 14/508,136, entitled "Container with Cover," filed Oct. 7, 2014, and U.S. patent application Serial No. U.S. Ser. No. 14/877,534, entitled "Flexible LED Lighting Element," filed Oct. 7, 2015.

BACKGROUND

A passenger service unit (PSU) is a unit provided on a vehicle that allows interaction between the vehicle's service providers and passengers, and provides necessary hardware/software for providing various passenger services. In an aircraft, this unit is typically located above a passenger's seat. In general, it is desirable to make PSUs highly functional, yet at the same time, keeping them simple, inexpensive, and lightweight.

The PSU on an aircraft typically includes lighting components (e.g., overhead reading lamps, etc.), emergency oxygen components (e.g., oxygen tank, drop-down masks, etc.), and crew communication components (e.g., cabin attendant button, light-up communication icons such as keep seatbelt fastened and no smoking, a speaker for in-flight verbal communications from pilot and crew. Etc.). Each of these three component sets is typically designed by a separate group of engineers, possibly by a separate organization, and requires its individual power supply and communication feeds. These redundant components increase the weight of the PSU, the complexity of install, the footprint of the install, and the overall cost of the PSU.

SUMMARY OF ILLUSTRATIVE EMBODIMENTS

In a preferred embodiment, a PSU architecture design may incorporate features to convert input power (115 VAC/28 VDC) to supply control voltage and switch capability from digital communication signals to PSU components. This panel may be mounted overhead in the aircraft and houses components, in some examples, such as the passenger speaker, reading lights, attendant call lights, oxygen supply, and pulse oxygen controller. The Integrated PSU concept may reduce part count and consolidate components such as heat-sinks, bezels, housings and wire harnesses. Architectures developed using the concepts described herein may also differ from existing PSU designs in that the PSU may also house the electrical components necessary to reduce electrical wiring throughout the aircraft and reduce the need for multiple overhead equipment units (OEUs), or separate power conversion and control modules throughout the aircraft.

In some implementations, a common data communication interface (i.e. RS-485 protocol) from the aircraft Cabin Management System (i.e., CSS, OEU, ZMU, etc.) is provided to communicate with the passenger service units, and drive voltage requirements, reading light control, speaker audio signal, and manage power for call lights, accent lighting, and/or intelligent lighted seat row markers. Additionally, the controller can have the option of controlling a mood lighting edge on the passenger service unit, call light bezels that would light when activated, and emergency lighting if these features are selected. This integrated PSU module can also include the capability of interfacing with local and seat level control inputs.

In a preferred embodiment, an integrated speaker-light unit may include a speaker disposed proximate a speaker horn, an LED unit mounted so that it is at least partially surrounded by the speaker horn, and at least one lamp mount beneath the LED light unit for directing light to a passenger. The speaker-light unit may include a single integral housing that contains both the lamp mount and the speaker. The lamp mount may include a lens. The LED unit may be mounted along a central longitudinal axis of the speaker horn. The LED unit may include multiple LED lights, for example to control light color delivered through the lamp mount or to illuminate multiple lamp mounts incorporated with the same speaker horn.

In a preferred embodiment, an overhead passenger service unit (PSU) for a vehicle includes a mounting mechanism for mounting the PSU above at least one vehicle seat; a dynamic seat row marker that provides an indication of a seat position and a status portion indicating a status of a passenger or trip aspect that is readily viewable from a vehicle aisle and is changeable during a trip, and a programmable active display that is readily viewable from a passenger seat and provides trip changeable information about the trip to the passenger.

In some implementations, the PSU may also include a lighting unit, an oxygen supply system, and a single connector for a single wire bundle that provides power and communications for the lighting unit as well as for the dynamic seat row marker, the programmable active display, and the oxygen supply system. The PSU may also include a flexible printed circuit board (PCB) with master control circuitry for controlling both the lighting unit and the oxygen supply system. The single connector providing power and communications may provide power and communications to the flexible PCB.

Table of Acronyms

ACARS Aircraft Communications Addressing Reporting System
ACP Audio Control Panel
ASCII American Standard Code for Information Interchange
AIMS Airplane Information Management System
AMU Audio Management Unit
AEP Audio Entertainment Player
ASG ARINC Signal Generator
ATA Air Transport Association
ANS Ambient Noise Sensor
ARINC Aeronautical Radio, Inc.
AWG American Wire Gauge
BIT Built in Test
BITE Built in Test Equipment
CACP Cabin Area Control Panel
CAH Cabin Attendant Handset
CAN Controller Area Network
CCITT Consulting Committee, The International Telegraph and Telephone CCP Cabin Control Panel
CCS Cabin Communication System
CCSD CSS Central Storage Device
CDR Critical Design Review
CDU Control and Display Unit
CFS Cabin File Server
CI Cabin Interphone
CIS Cabin Interphone System
CLS Cabin Lighting System
CMCS Central Maintenance Computer System
CP Core Partition
CRC Cyclic Redundancy Check
CSCP Cabin System Control Panel
CSCP CP CSCP Core Partition
CSCP DP CSCP Display Partition
CSMU Cabin System Management Unit
CSS Cabin Services System
CW Continuous Wave
dB Decibels
dBc Decibels relative to carrier level
dBm Decibels relative to a milliwatt
dBmV Decibels relative to a millivolt
DCAS Digital Control Audio System
DCMF Data Communication Management Function
DLS Data Load System
DITS Digital Information Transfer System
DP Display Partition
D1MF Dual Tone Multi-frequency
ECS Environmental Control System
EEPROM Electrically Erasable Programmable Read Only Memory
EICAS Engine Indication Caution Alerting System
ELMS Electrical Load Management System
EMC Electromagnetic Compatibility
EMI Electromagnetic Interference
ETOPS Extended Twin Operations
FAR Federal Aviation Regulation
FCC Federal Communications Commission
FCM Functional Circuit Module
FDD Floppy Disk Drive
FDH Flight Deck Handset
FMEA Failure Modes and Effects Analysis
FSEU Flap Slat Electronics Unit
FTK Functional Test Kernel
FTP File Transfer Protocol
GSE Ground Support Equipment
GTR General Technical Requirements
Hz Hertz
IFE In-Flight Entertainment (System/Unit)
IFES In-Flight Entertainment System
INOP Inoperable
ISO International Standard Organization
LAN Local Area Network
LAV Lavatory
LCD Liquid Crystal Display
LED light emitting diode
LRU Line Replaceable Unit
MAT Maintenance Access Terminal
MCF Monitor and Control Functions
MCDU Multi-purpose Control and Display Unit
MCU Modular Concept Unit
MMC Mass Memory Card
MMo Mach Number, Maximum Operating
MTBF Mean Time Between Failure
NTSC National Television Standard Committee
NVM Non-volatile Memory
O.D. Outside Diameter
OEU Overhead Electronics Unit
OMS Onboard Maintenance System
OPAS Overhead Panel ARINC System
OPC Operational Program Configuration
OPS Operational Program Software
OSI Open Systems Interconnect
PA Passenger Address
PAL Phase Alternation Line
PAS Passenger Address System
PCB Printed Circuit Board
PDR Preliminary Design Review
PABX Private Automatic Branch Exchange
PCU Passenger Control Unit
POU Passenger Overhead Unit
PRAM Prerecorded Announcement Machine
PSEU Proximity Electronic Sensor Unit
PSS Passenger Service System
PSU Passenger Service Unit
PTT Push-To-Talk
RAM Random Access Memory
RF Radio Frequency
RPDU Remote Power Distribution Unit
RTCA Radio Technical Commission for Aeronautics
SCD Specification Control Drawing
SCSRD Standard Cabin System Requirements Document (D6-36440)
SDM Speaker Drive Module
SDRL Supplier Data Requirements List
SFE Seller Furnished Equipment
SSU Smart Service Unit
STC Supplemental Type Certification
SWCM Software Configuration Management
TBD To Be Determined
TCF Test Control Function
TCP/IP Transmission Control Protocol/Internet Protocol
THD Total Harmonic Distortion
TIU Telephone Interface Unit
ULC Universal Logic Card
VAC Voltage, Alternating Current
VcAs Velocity, Calibrated Air Speed
VDC Volts Direct Current
VGA Video Graphics Array
VIU Video Interface Unit
VMo Velocity, Maximum Operating
VTR Video Tape Reproducer
WAP Wireless Access Point
WES Warning Electronics System
ZMU Zone Management Unit The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 3B is a pictorial top view diagram illustrating details of the PSU in FIG. 3A;

FIG. 6 is a block diagram illustrating various wiring architectures related to the PSUs;

DETAILED DESCRIPTION OF ILLUSTRATIVE EMBODIMENTS

Figure 1:
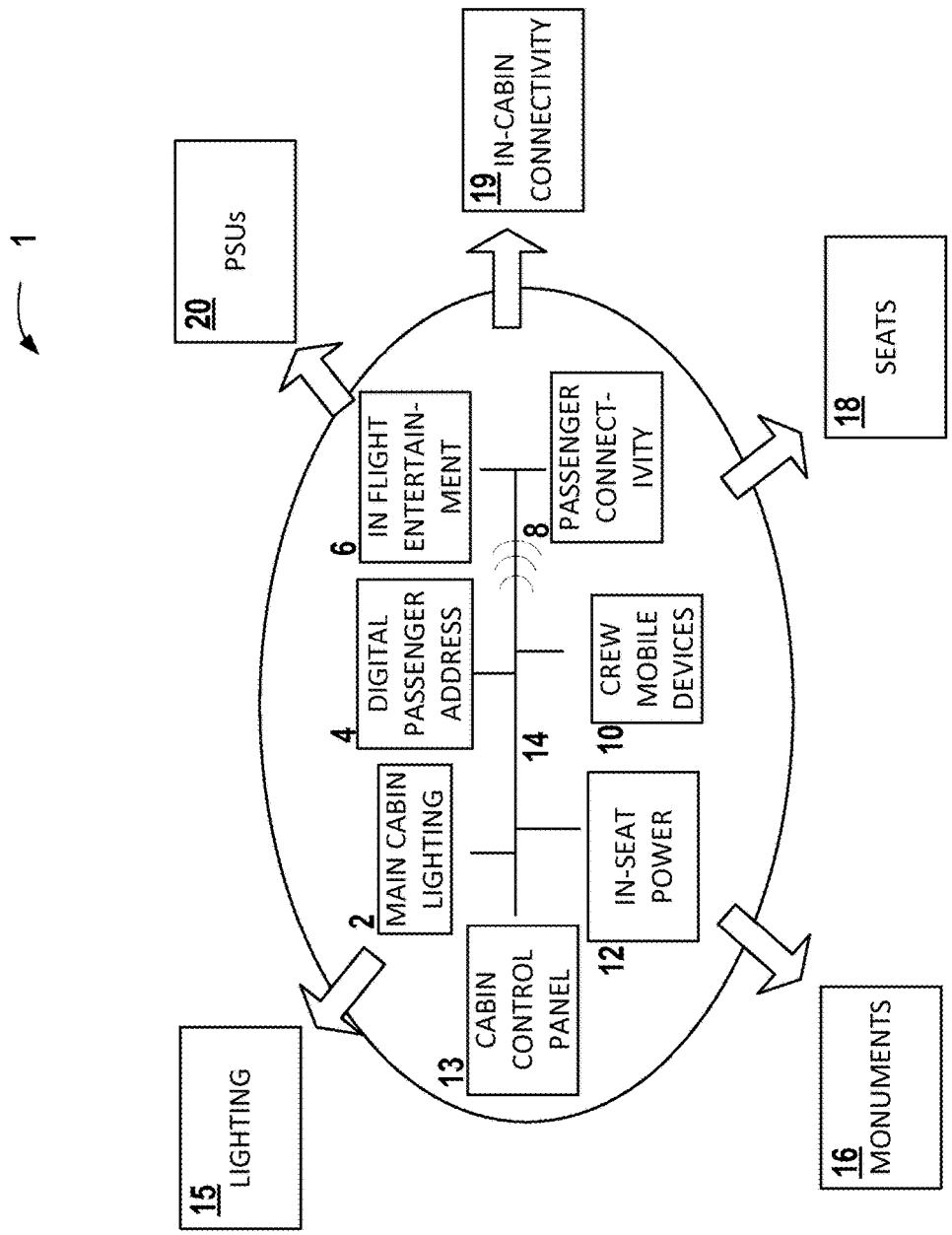
FIG. 1 is a block diagram illustrating various operational components of an aircraft interior.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Described herein is a passenger service unit (PSU) for a vehicle (as described herein, the vehicle is an aircraft, but could be any vehicle with a PSU) with an intelligent design that forms a part of an integrated cabin system.

FIG. 1 is a block diagram showing an overview of an integrated cabin system 1. The cabin systems include various elements that are able to communicate with one another over a common network 14. These elements include main cabin lighting 2, a passenger address system 4, in-flight entertainment (IFE) 6, passenger connectivity 8, crew mobile devices 10, in-seat power 12, and a control panel 13. These interact with or support a lighting system 15 that provides dynamic cabin lighting that creates an immersive experience for the passengers, monuments 16, such as galley inserts, lavatories, closets, dividers, entryways, and potable and waste water. The seat systems 18 integrate the IFE and passenger overhead unit (POU) power, actuation, reading lights, and controls. In-cabin connectivity 19 is provided for passengers, such as WiFi, Internet and IFE delivery, and entertainment content. Finally, the integrated cabin system includes the PSUs 20, which incorporate an attendant call, digital signage, displays, reading lights, etc.

Figure 2:
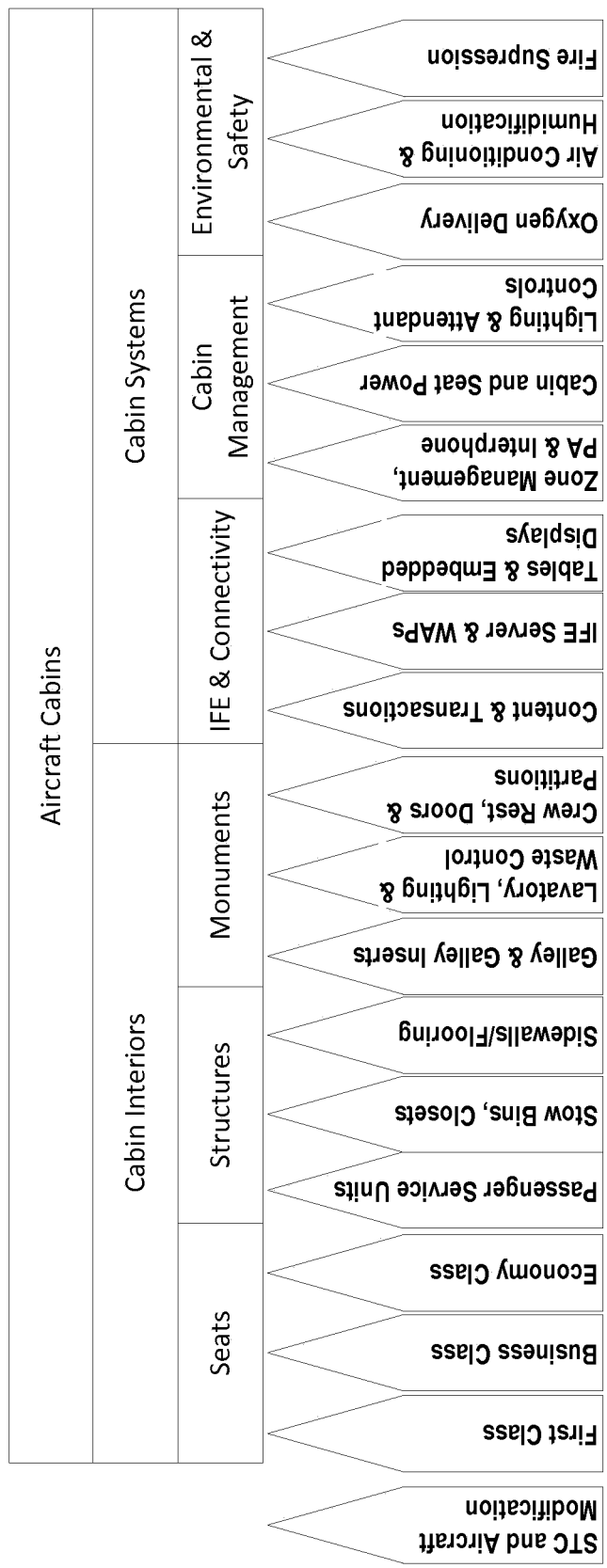
FIG. 2 is a block diagram illustrating the relationships of various components within the aircraft.

FIG. 2 provides a further breakdown of certain aircraft cabin components illustrated in FIG. 1. The aircraft cabin may be broken down into two primary elements: cabin interior and cabin system. Regarding the cabin interior (which includes seats, structures, and monuments), the seats may be broken down into first, business, and economy classes. The structures include PSUs, stow bins and closets, and sidewalls/flooring. The monuments include galley and galley inserts, lavatory lighting & waste control.

Regarding the cabin systems (which includes IFE & connectivity, cabin management, and environmental & safety), the IFE & connectivity may be broken down into content & transactions, IFE servers and WAPs, and tables & embedded displays. The cabin management may include zone management, PA, and interphone, cabin and seat power, and lighting & attendant controls. The environmental & safety may include oxygen delivery, air conditioning & humidification, and fire suppression. The aircraft modification shown on the left-hand side of FIG. 2 is overarching, and refers to modification of the aircraft as a whole. An OEM attains a type certificate (TC) from the FAA that grants regulatory authorization to fly the aircraft. All modifications done to the aircraft after original type certification are approved via amended type certificate (by the OEM) or Supplemental Type Certificate (STC) which is open for parties other than the OEM.

Figure 3A:
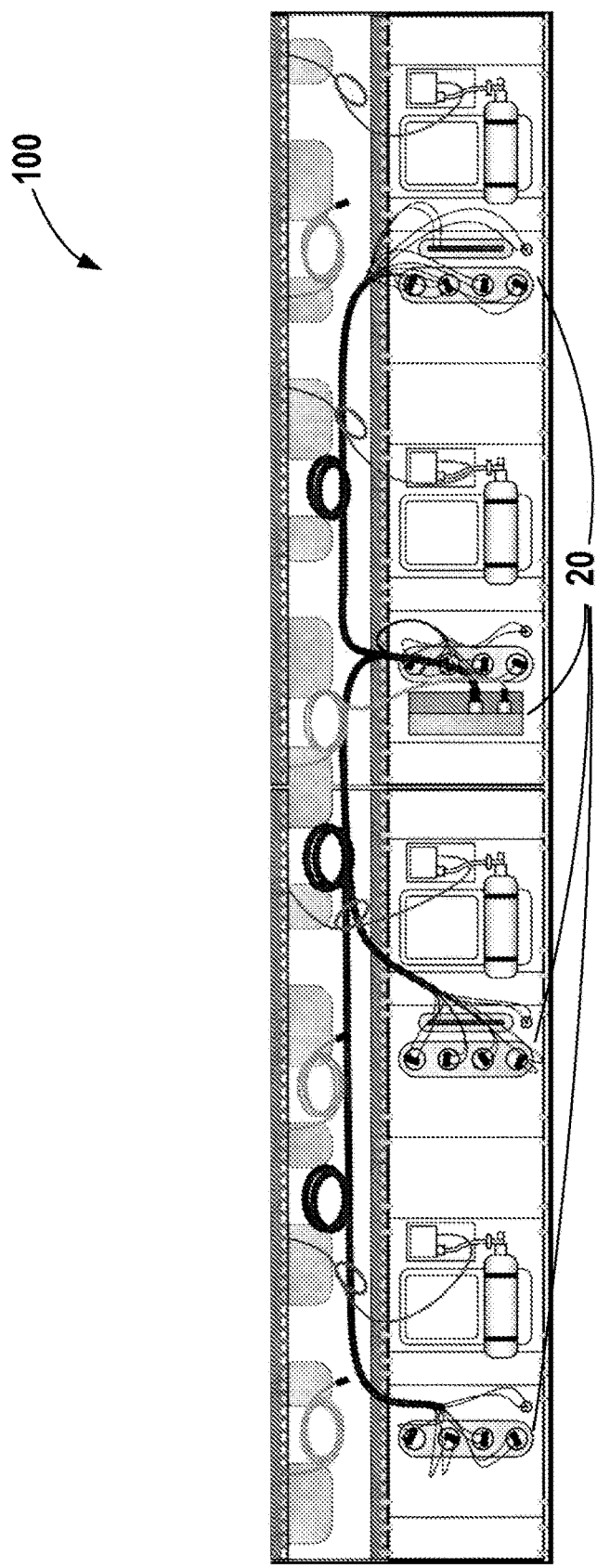
FIG. 3A is a pictorial top view diagram illustrating a first embodiment of an OEU with multiple PSUs.

FIG. 3A illustrates an embodiment of a wiring architecture for PSUs 20 in which a group of PSUs 20 are shown. In the design shown, there are four PSUs 20 per OEU 100. The wiring allows cabin pressure to be monitored at each oxygen control module. The initiator sequencing is managed by a built-in test (BIT) power wire assert between the control modules in the column (of seats running fore and aft, and center column, on a twin aisle aircraft (left and right columns on a single aisle aircraft).

Figure 4A:
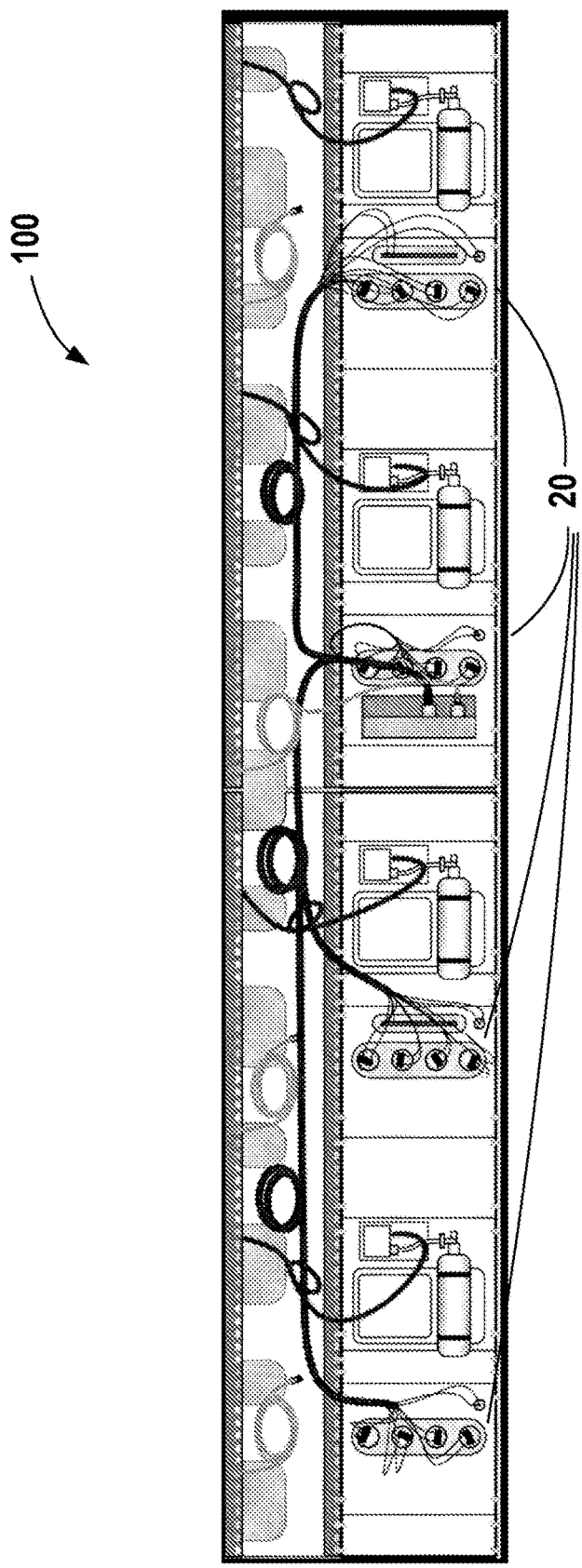
FIG. 4A is a pictorial top view diagram illustrating a second embodiment of an OEU with multiple PSUs.
Figure 4B:
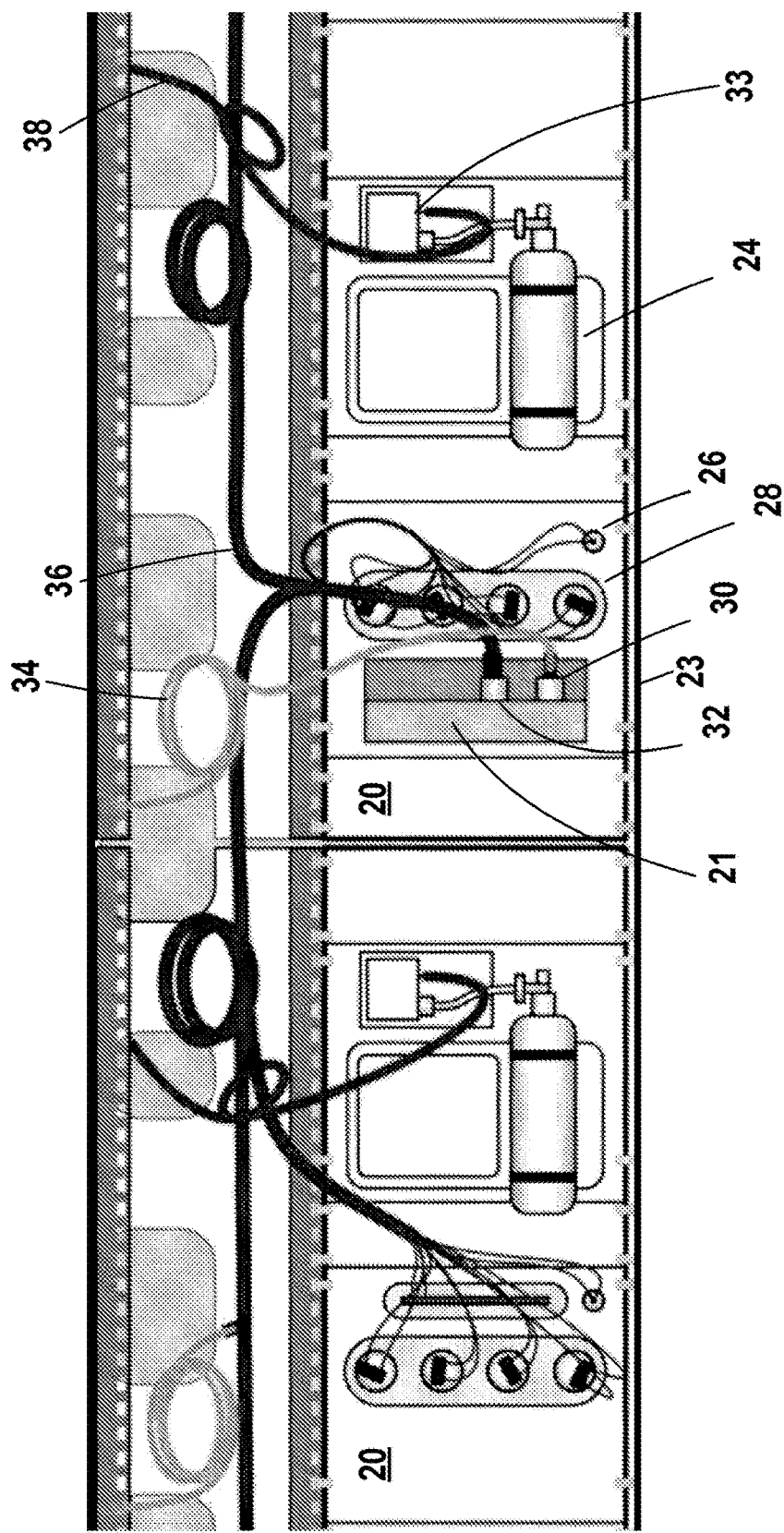
FIG. 4B is a pictorial top view diagram illustrating details of the PSU in FIG. 4A.

FIG. 3B is a more detailed diagram of the OEU shown in FIG. 3A and illustrates the composition of the PSUs 20 and associated wiring. The PSUs 20 can include a programmable active display (information sign) 21 that is readily viewable by a seated passenger and displays things such as "fasten seat belt" and "no personal electronic devices (PEDs)", a dynamic seat row marker 23 that is readily viewable from a vehicle aisle, an oxygen system 24 (with masks and associated deployment hardware), a call button 26, task lights 28, and first 30 and second 32 cable bundle connectors for connecting, respectively, first 34 and second 36 cable bundles to the PSU 20. There is also a third connector 33 for connecting the oxygen system cable bundle 38 to the oxygen system 24. In this design, the wiring requirements include a total of forty-eight wires, broken down as follows:

OEU Drops 34: an eight-wire bundle
two for power (115 VAC)
six for data (RS-485 in/out)
OEU Feeds 36: a common thirty-six wire bundle
twenty for reading lights
eight for ordinance
eight for attendant call
Oxygen Power a four-wire bundle 38:
main power (28 VDC, 5 A)
backup power (28 VDC, 5 A)
BIT power (28 VDC, 2.5 A)
common FIGS. 4A and 4B illustrate an embodiment similar to that shown in FIGS. 3A and 3B, but also includes an oxygen system that has an altitude input module. In this configuration, the oxygen cable bundle 38 adds two additional wires to accommodate controller area network (CAN) (high/low) bus communications over which the altitude data can be sent and enabling health management. In this design, the wiring requirements include a total of fifty wires, broken down as follows:

OEU Drops 34: an eight-wire bundle
two for power (115 VAC)
six for data (RS-485 in/out)
OEU Feeds 36: a common thirty-six wire bundle
twenty for reading lights
eight for ordinance
eight for attendant call
Oxygen Power a six-wire bundle 38:
main power (28 VDC, 5 A)
backup power (28 VDC, 5 A)
BIT power (28 VDC, 2.5 A)
common
CAN (high/low)

Figure 5A:
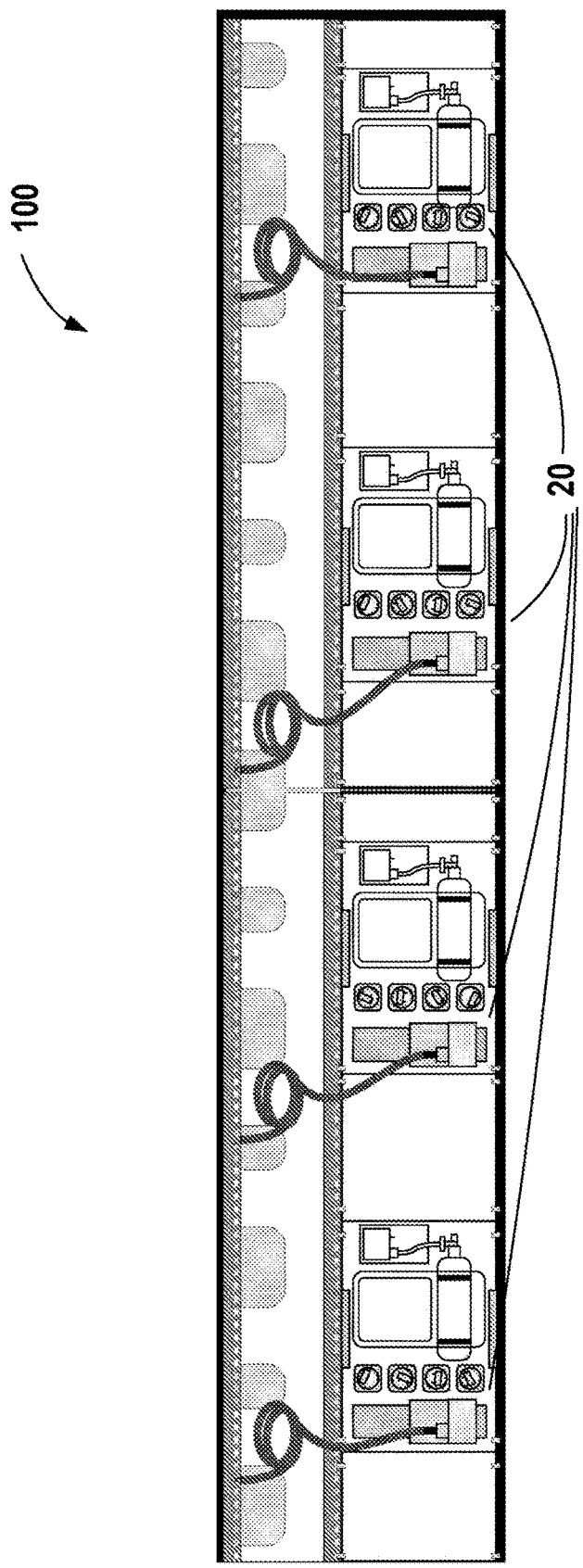
FIG. 5A is a pictorial top view diagram illustrating a third embodiment of an OEU with multiple PSUs.
Figure 5B:
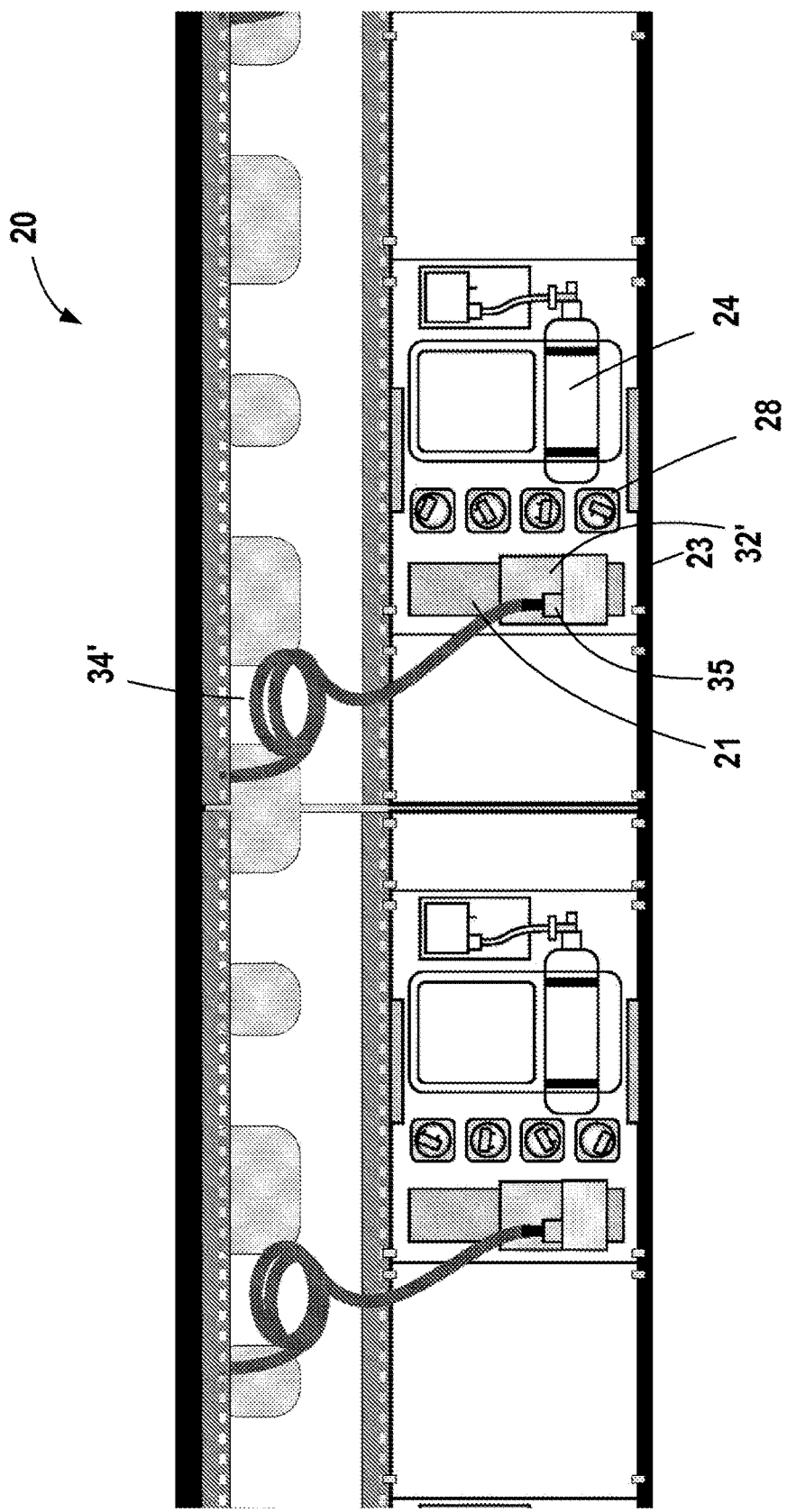
FIG. 5B is a pictorial top view diagram illustrating details of the PSU in FIG. 5A.

FIGS. 5A and 5B illustrate a more integrated embodiment in which a single wire bundle 42 connects to the PSU 20 via a single connector 40. In this embodiment, by way of example only, this may be a thirteen-wire bundle in which:

SU Drops 34': a thirteen-wire bundle
three for 02 power (main, backup, and return)
two for 02 CAN (high/low)
two for SU power (inc. 02 BIT)
six for SU data (RS-485 in/out)

This results in a significant reduction in wiring, connectors, weight, service burden, etc. for the aircraft. That is, the benefits of the integrated system include eliminating a significant amount of wiring, pinouts, OEUs, significantly simplifies the engineering by having a single, stable wire bundle for all layouts. It simplifies line fit operations and minimizes part number count. FIG. 6 illustrates wiring architectures according to various embodiments.

Figure 7:
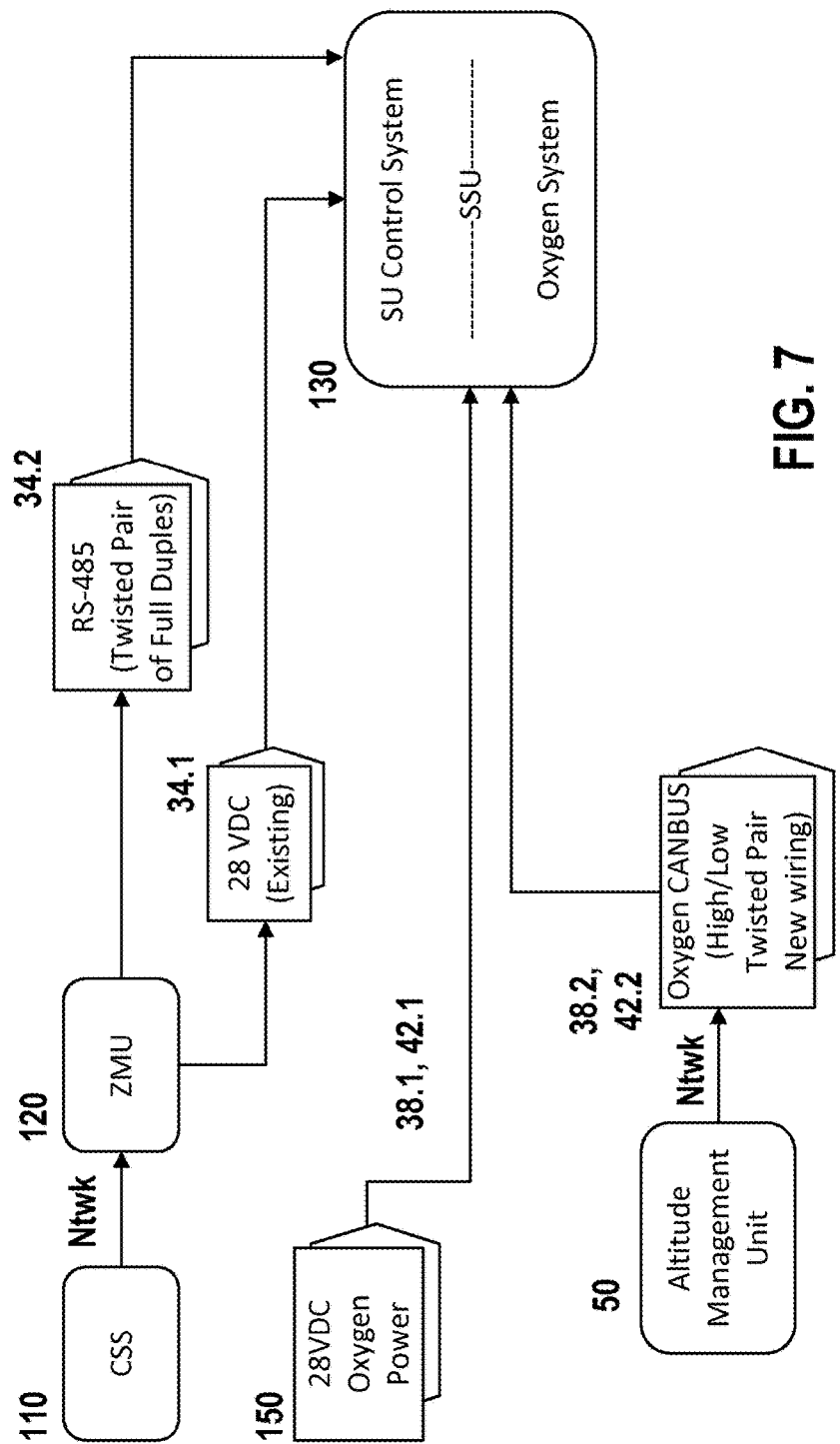
FIG. 7 is a block diagram illustrating the interconnected components, including oxygen system and altitude management unit.

FIG. 7 is an example block diagram layout according to an embodiment. The cabin services system (CSS) 110 is connected to a zone management unit (ZMU) 120 via some form of network. The ZMU 120 interfaces to the smart service unit (SSU) 130 providing power 34.1 (e.g., 28 VDC) and data communication 34.2 (e.g., RS-485) lines. Oxygen power 150 (e.g., 28 VDC) can also be provided via cable bundle 38.1. Finally, the altitude management unit 50 can be connected to the oxygen CANBUS interface via a network, and this interface is connected to the SSU 130 via cable bundle 38.2.

Figure 8:
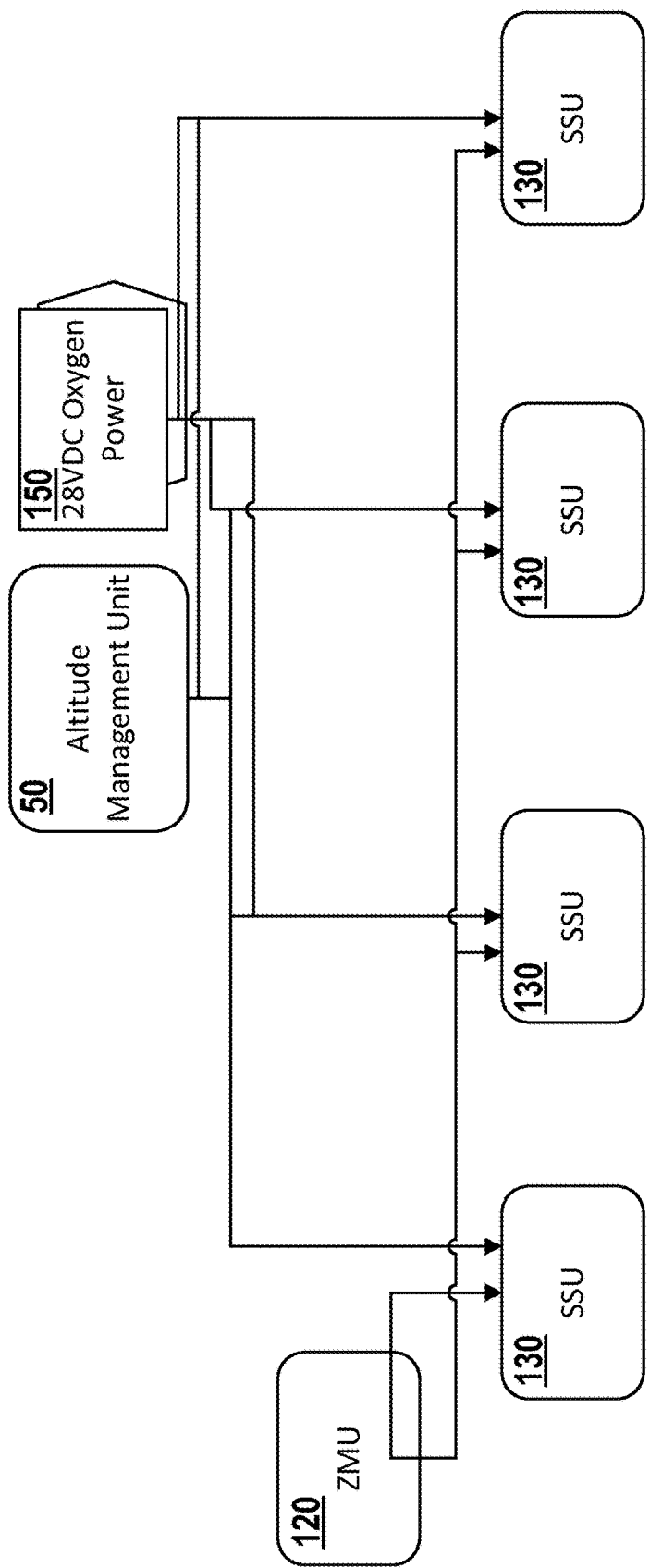
FIG. 8 is a block diagram illustrating an alternate approach for interconnecting the components.

FIG. 8 is an example block diagram layout similar to FIG. 7, where a single cable bundle 42 is provided to the SSU 130 (the cable branching occurs at other locations within the aircraft).

The SSU 130 reduces visual clutter for the passenger and provides a targeted delivery of information to the passenger, as is illustrated in the embodiments according to FIGS. 14-18. The integrated systems permit PSU lighting scenes to be coordinated with the cabin scenes. They also permit a comprehensive onboard diagnostics and health management ability. The enhanced cabin crew communications provide a new tool to streamline cabin services.

Figure 32:
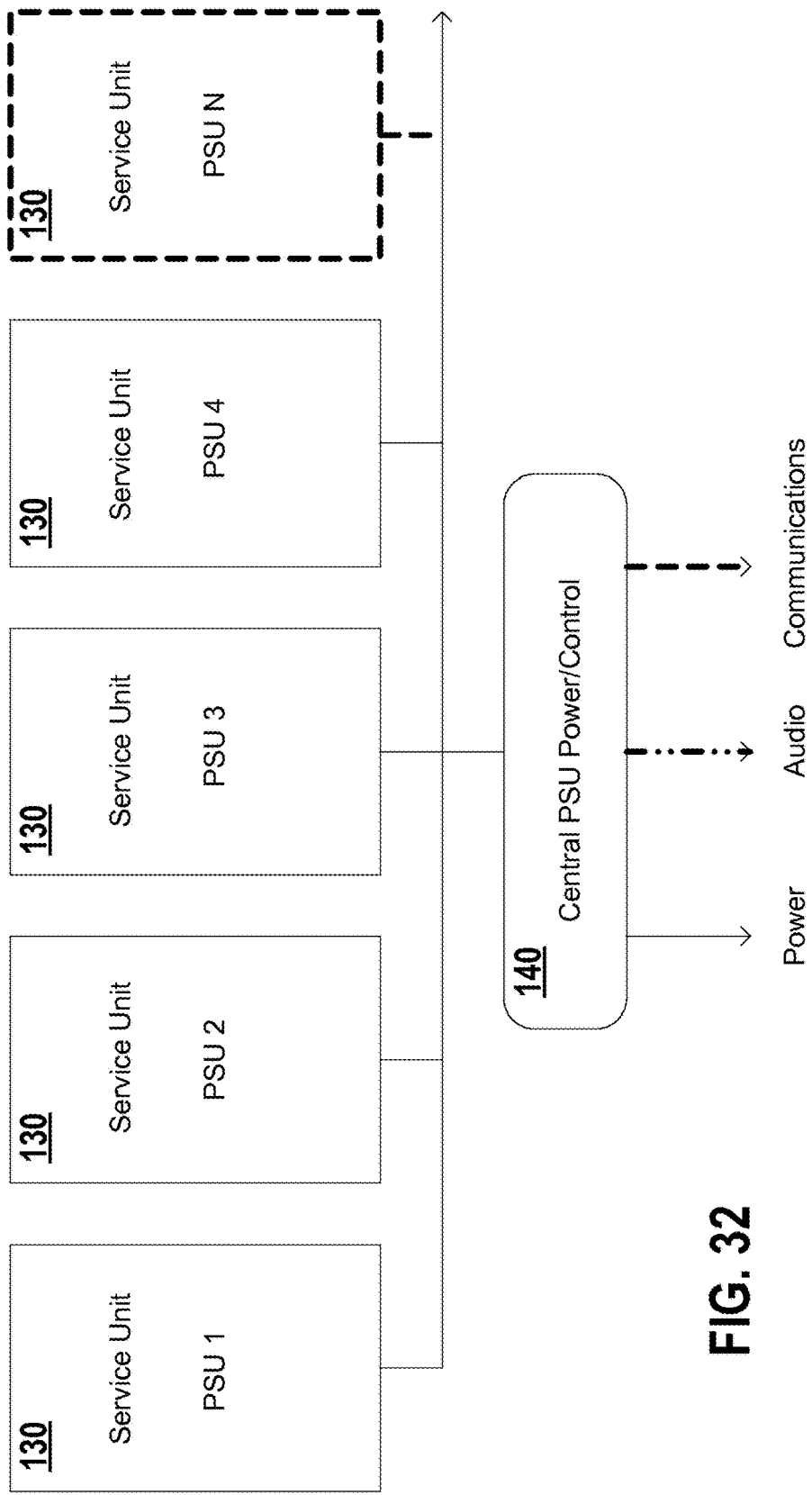
FIG. 32 is a block diagram illustrating the relationship between the service units and central service unit power/control in a centralized group or rib architecture.

FIG. 32 shows a networked interconnection between a number of service units 130 and the central service unit power/control 140 having interfaces to power, audio, and communications of the aircraft.

Figure 9:
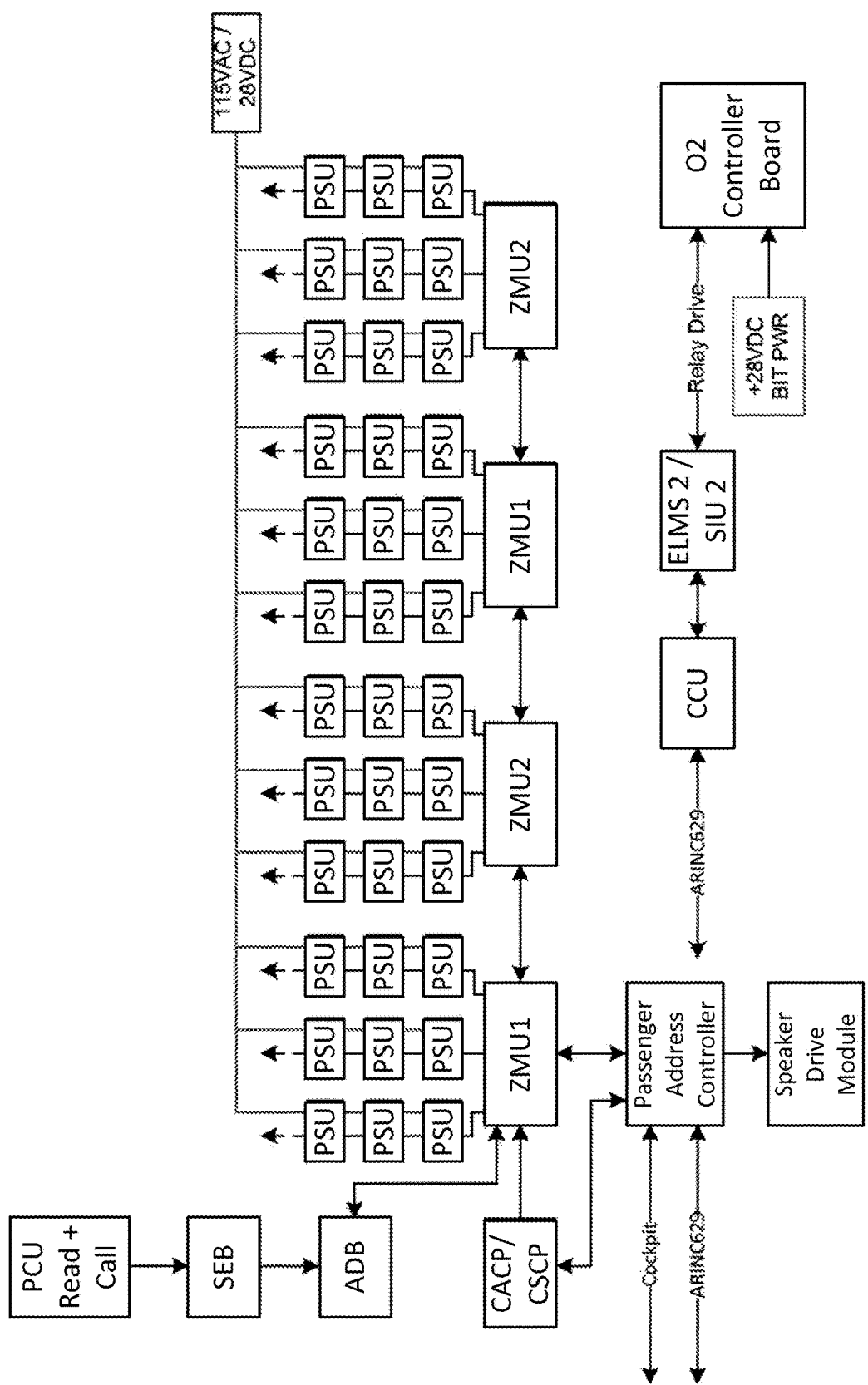
FIG. 9 is a block diagram illustrating additional components and interconnection hierarchy.

FIG. 9 is a block diagram illustrating an organization of the PSUs into zone management areas, each controlled by a zone management unit. It illustrates how the smart PSU elements can be integrated into an existing airplane system architecture. Everything connected with the leftmost lines on the PSU is existing. The components connected with the rightmost lines on the PSUs relate to the new "smart" PSU.

Figure 10:
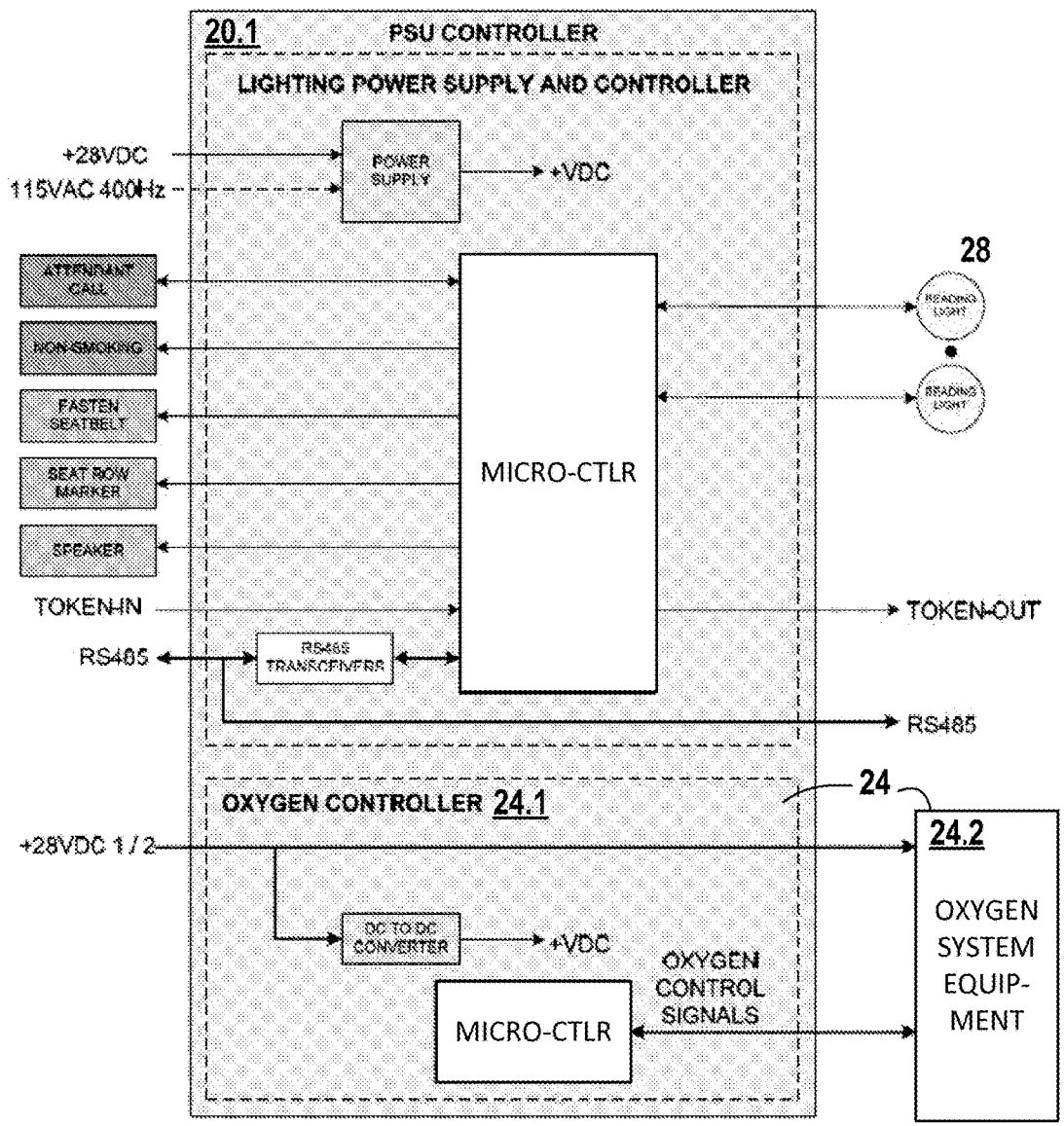
FIG. 10 is a block diagram illustrating an embodiment of a PSU controller and oxygen controller.

FIG. 10 is a block diagram illustrating both the PSU controller 20.1 and the oxygen controller 24.1. The PSU controller 20.1 contains a power supply that may take either AC (e.g., 115 VAC @ 400 Hz) or DC (e.g., 28 VDC) and convert it into DC voltage usable by the PSU controller. The PSU Controller contains a micro-controller with a communications interface for, e.g., RS-485 and a token-in, token-out communications. It also has I/O for the reading lights 28, attendant call, non-smoking display, fasten seatbelt display, seat row marker display, and the speaker. The oxygen controller 24.1 includes a power supply converter and a micro-controller that interfaces with the oxygen system equipment 24.2.

Figure 11:
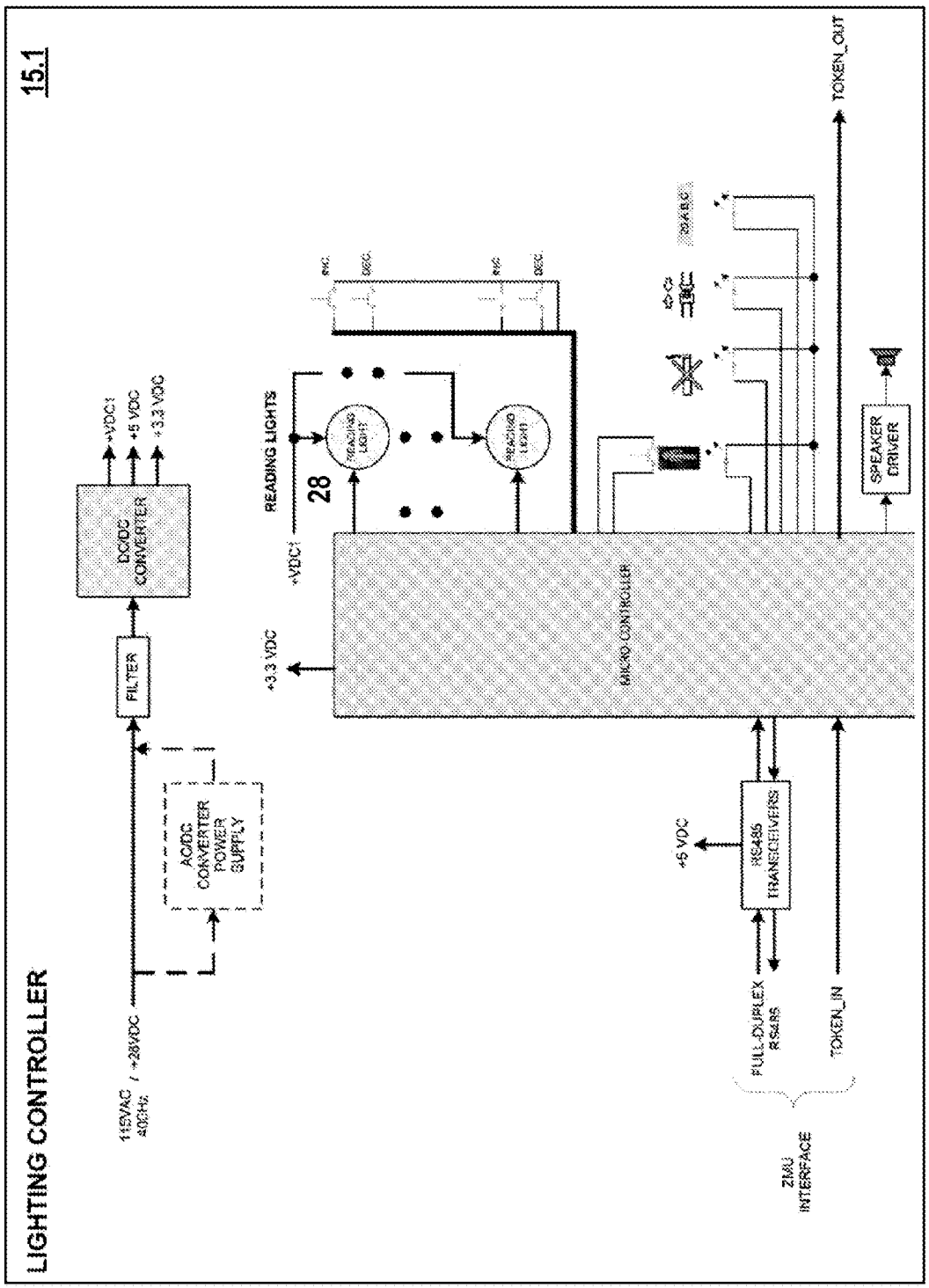
FIG. 11 is a block diagram illustrating an embodiment of a PSU controller and oxygen controller.

FIG. 11 is a block diagram for the lighting controller 15.1, also including a power supply and micro-controller. The micro-controller interfaces to the reading lights 28. In the previous FIG. 10, it shows the PSU controller interfacing to these lights. The lighting controller is a part of the PSU interface, and includes a zone management unit interface for RS-485 and token communications. FIG. 10 shows the PSU controller including both lighting and oxygen system control. FIG. 11 shows the lighting portion only, with slightly more detail.

Figure 12:
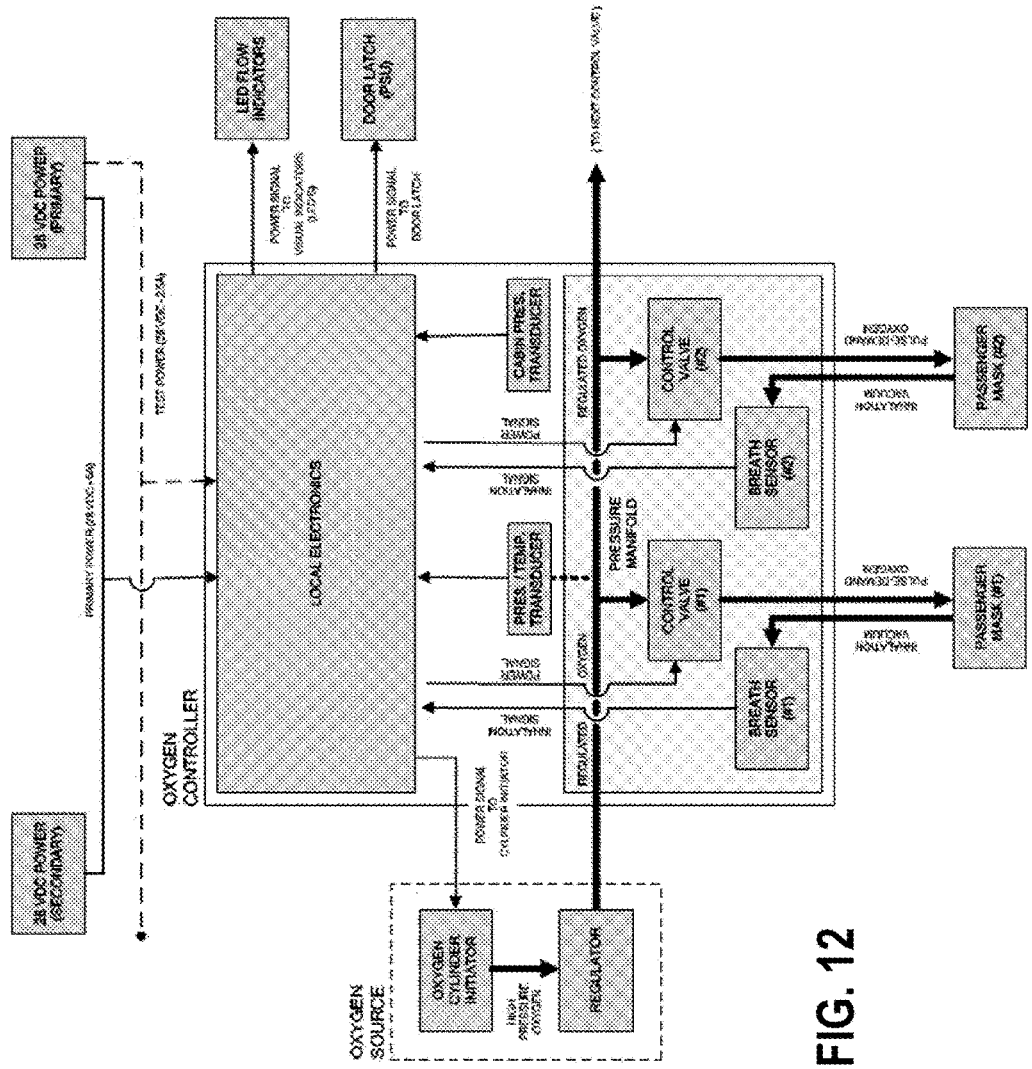
FIG. 12 is a detailed block diagram illustrating a first embodiment (no CAN) of the 10 oxygen controller.

FIG. 12 is a block diagram illustrating the oxygen controller 24.1 in a no controller area network (CAN) configuration. The local electronics are powered by a power supply and provide an interface to LED flow indicators and the PSU door latch that opens the door to allow oxygen masks to drop. The local electronics also include an interface to the oxygen cylinder initiator that begins the flow of high pressure oxygen into a regulator. The regulator controls the correct amount of oxygen flow. The local electronics include interfaces to breath sensors, control valves for the regulated oxygen, a pressure/temperature transducer, and a cabin pressure transducer. The breath sensor and control valve interfaces with the passenger mask to ensure proper flow of oxygen to the user.

Figure 13:
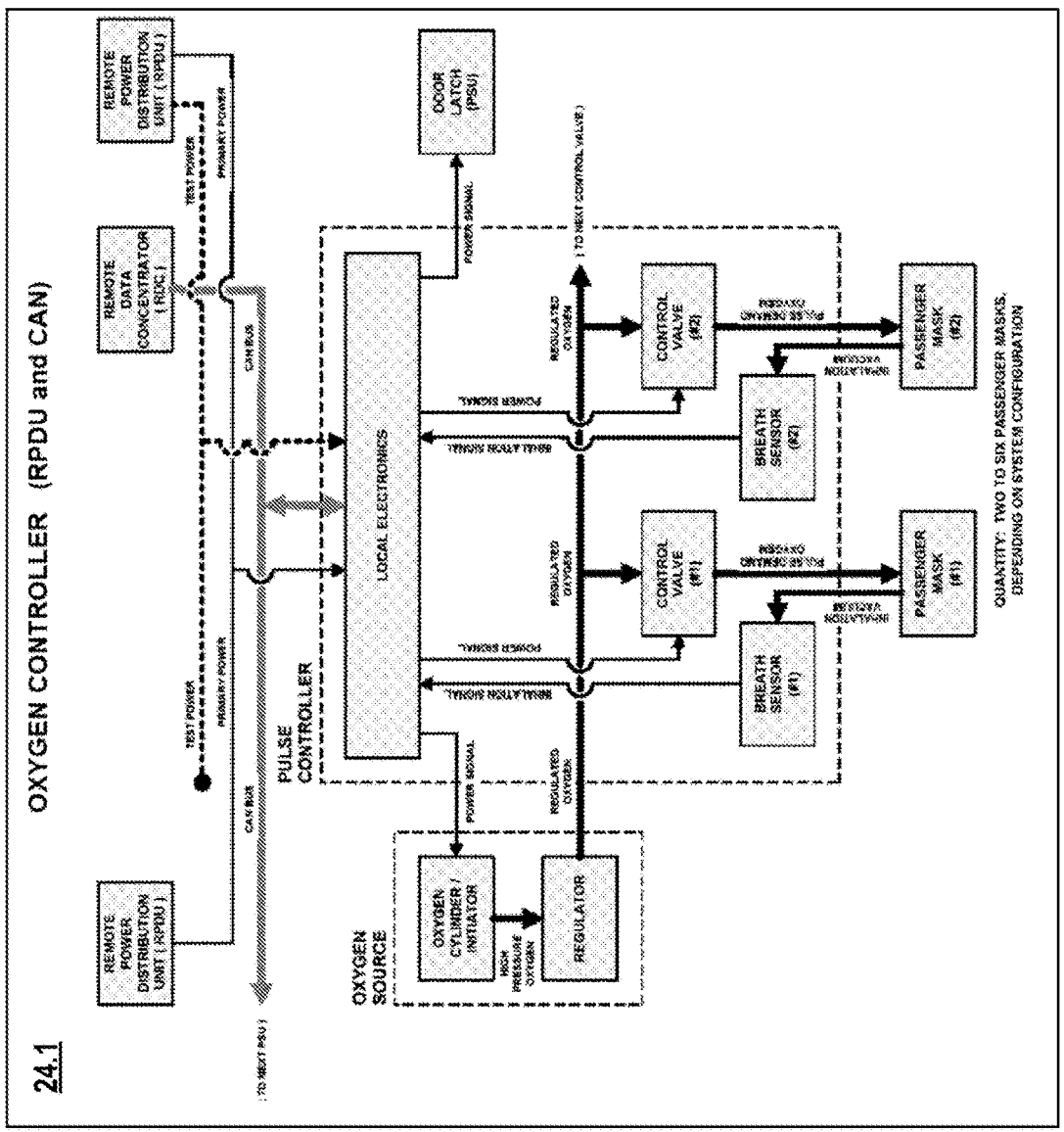
FIG. 13 is a detailed block diagram illustrating a second embodiment (RPDU and CAN) of the oxygen controller.

FIG. 13 is a block diagram illustrating the oxygen controller 24.1 using a remote power 17 distribution unit (RPDU) and CAN configuration. In this configuration, the local electronics receive power from remote power distribution units and interface, via a CAN bus to a remote data concentrator (RDC). This illustrates the flexibility to adapt to the specific aircraft manufacturer and model databus configuration when different databus protocols are used.

Figure 14:
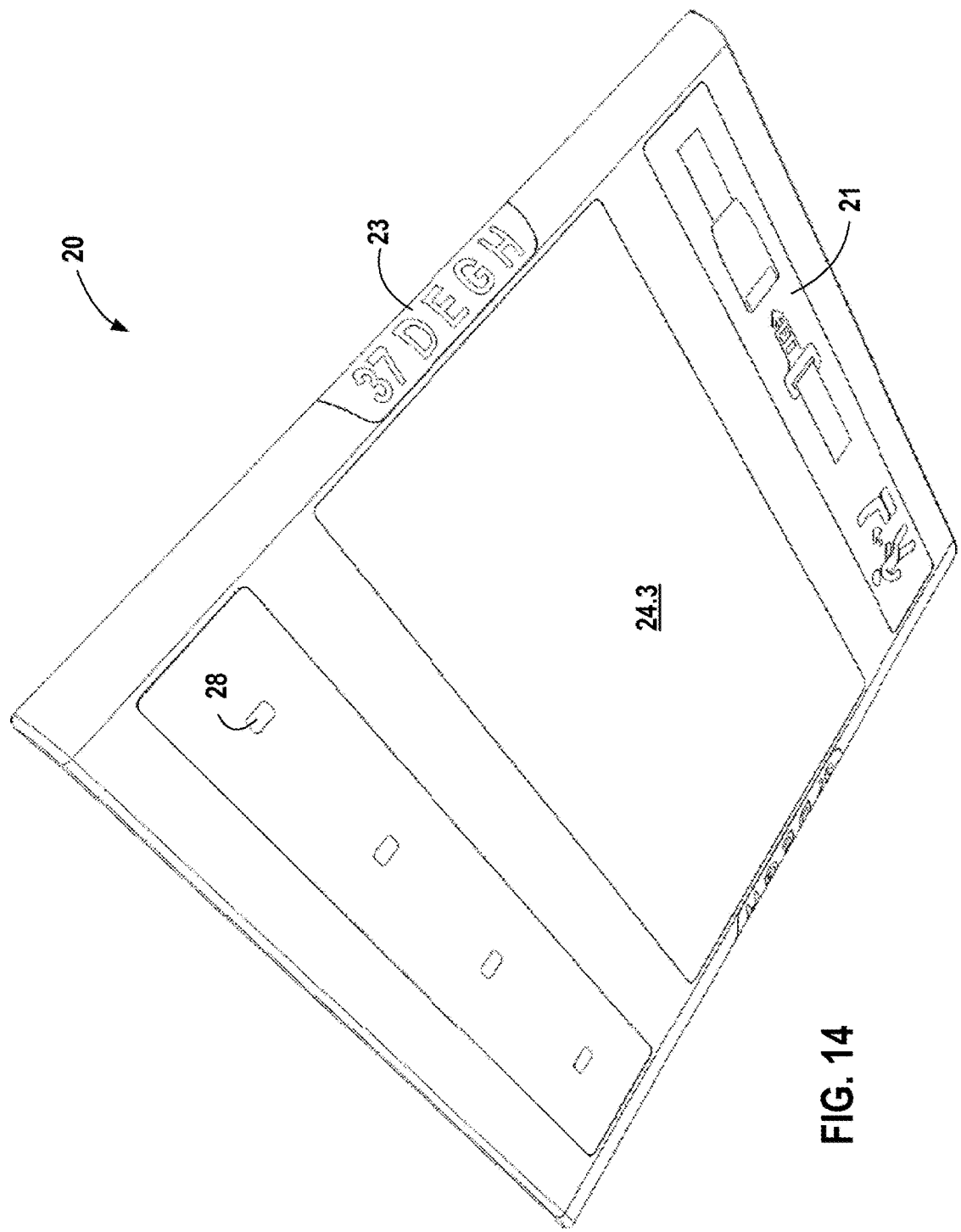
FIG. 14 is a bottom perspective pictorial view of a PSU.

FIG. 14 is a pictorial bottom perspective view of an embodiment of a PSU 20 shown in its mounted position. The active display 21 shows a current seatbelt and seating status, along with a seat row marker 23 and reading/task lights 28.

Figure 15:
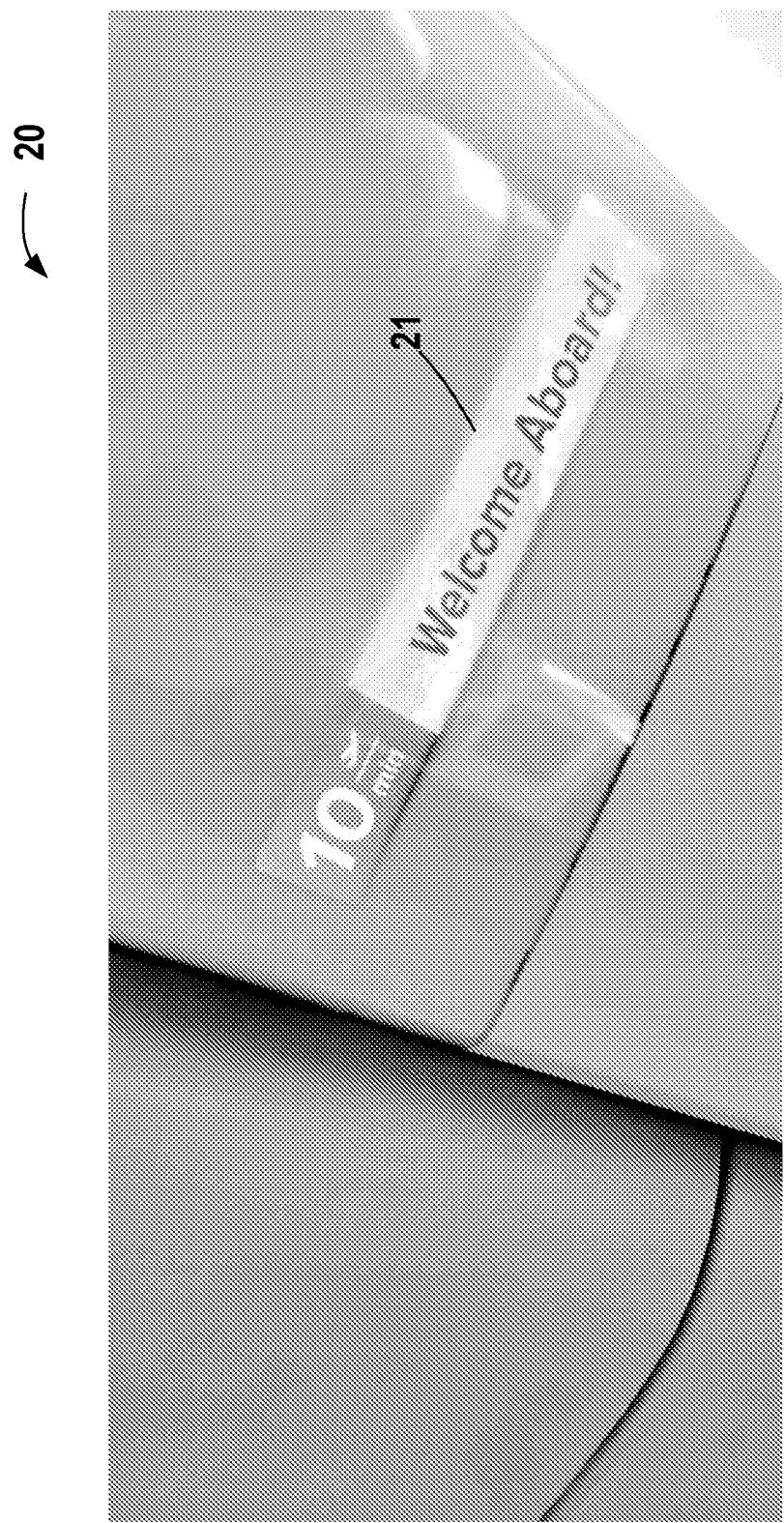
FIG. 15 is a bottom perspective pictorial view of a mounted PSU (with seating components reflected in the reflective surface covering) during a boarding phase.
Figure 16:
FIG. 16 is a bottom perspective pictorial view of a mounted PSU (with seating components reflected in the reflective surface covering) during a mid-flight phase.
Figure 17:
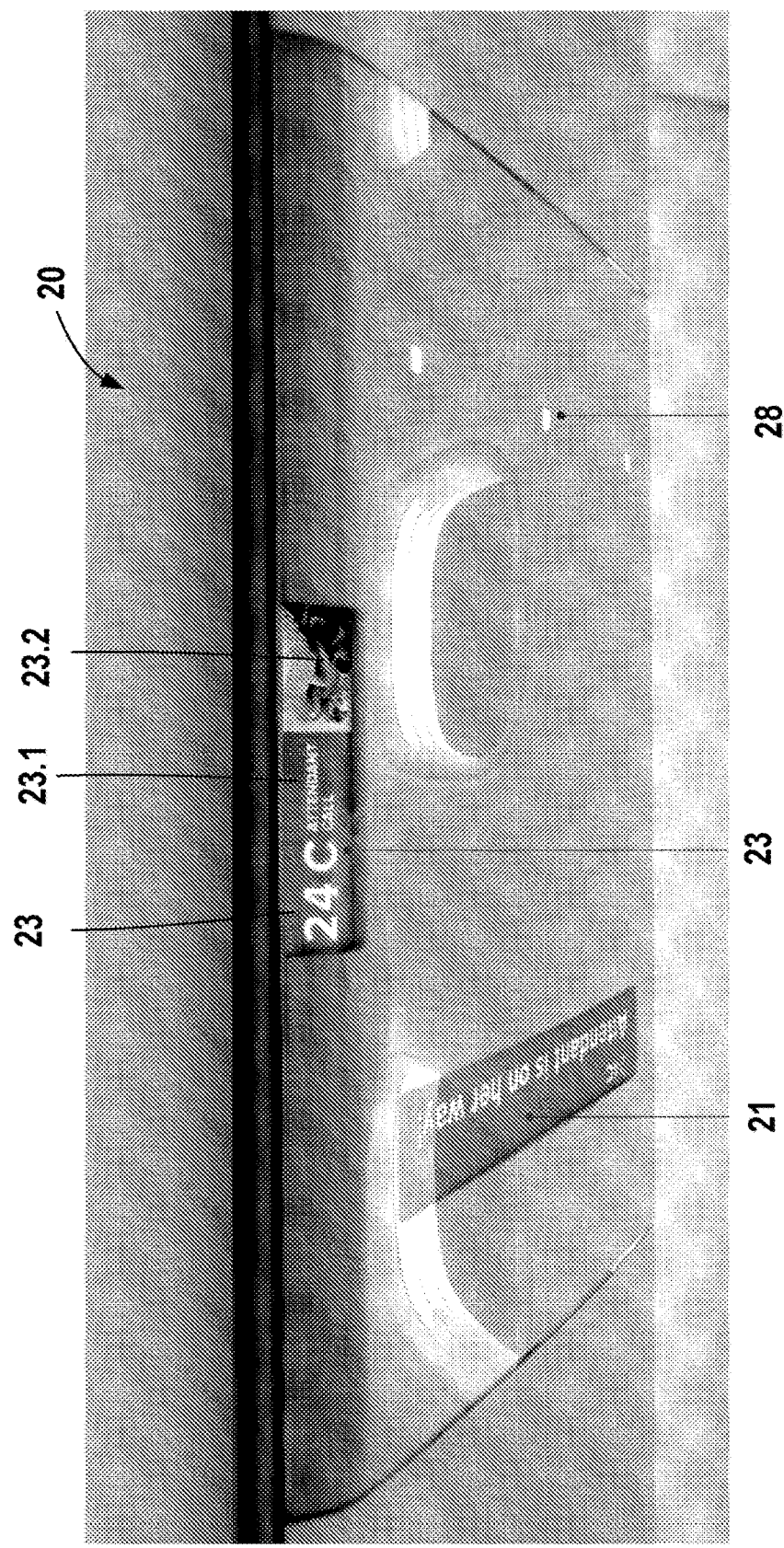
FIG. 17 is a bottom perspective pictorial view of an embodiment of a mounted PSU (with aircraft windows reflected in the reflective surface covering) after an attendant call has been activated.

FIG. 15 is a pictorial view showing the active display 21 of the PSU 20, e.g., during a boarding phase of the flight, indicating an amount of time until departure. As can be seen, the smooth surface contour features present reduced visual clutter to the user and allow many different languages (including seat-row individualized languages) to be easily presented to passengers. FIG. 16 shows the PSU 20 during a cruising portion of the flight, where a passenger has activated a do-not-disturb status 23.1. The remaining flight time is indicated in the active display 21, as well as a possible indication of the aircraft's position. FIG. 17 provides an illustration in which the active display 21 provides attendant call feedback along with the particular seat it relates to, and an additional status portion 23.2 provides an illustration of a passenger preference (e.g., type of meal). The seat row marker 23 can light up in different colors to indicate some form of status (e.g., to help the flight attendant navigate the cabin during meal service).

Figure 18:
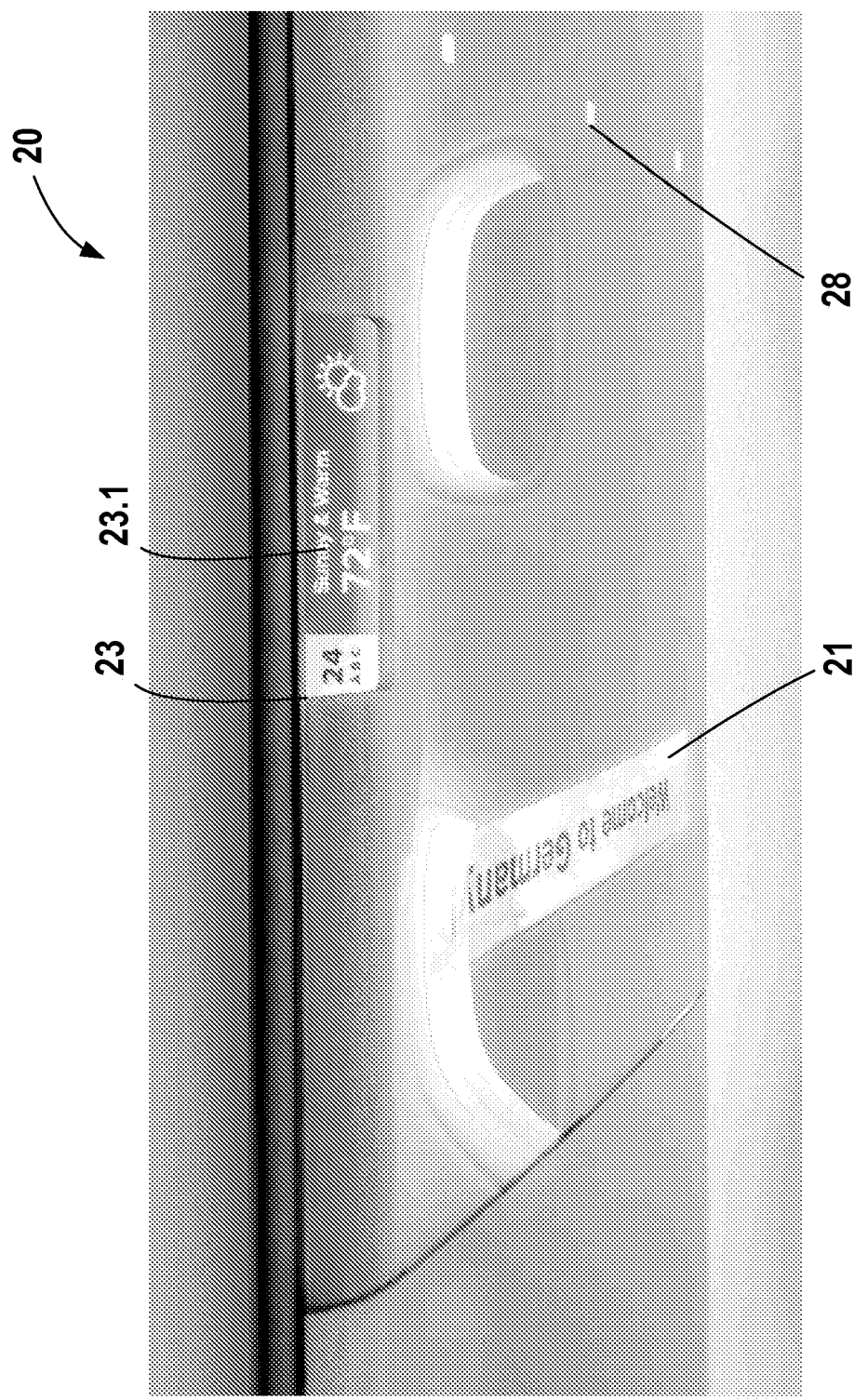
FIG. 18 is a bottom perspective pictorial view of an embodiment of a mounted PSU (with aircraft windows reflected in the reflective surface covering) after arrival.

Finally, FIG. 18 shows the PSU 130 during an arrival/deplaning phase, with a welcome message showing in the active display 21 and local weather information showing in the status portion 23.1 of the row marker 23. The PSU displays 21, 23 are connected to a centralized server unit that provides relevant status. Updates can be triggered periodically or as a result of a change of a situation, such as the passenger providing some input or some predefined point in the flight being reached. In the deplaning phase, the PSU displays 21, 23 can be programmed to provide passengers information about the destination as well as transfer and luggage claim information and directions.

Figure 19A:
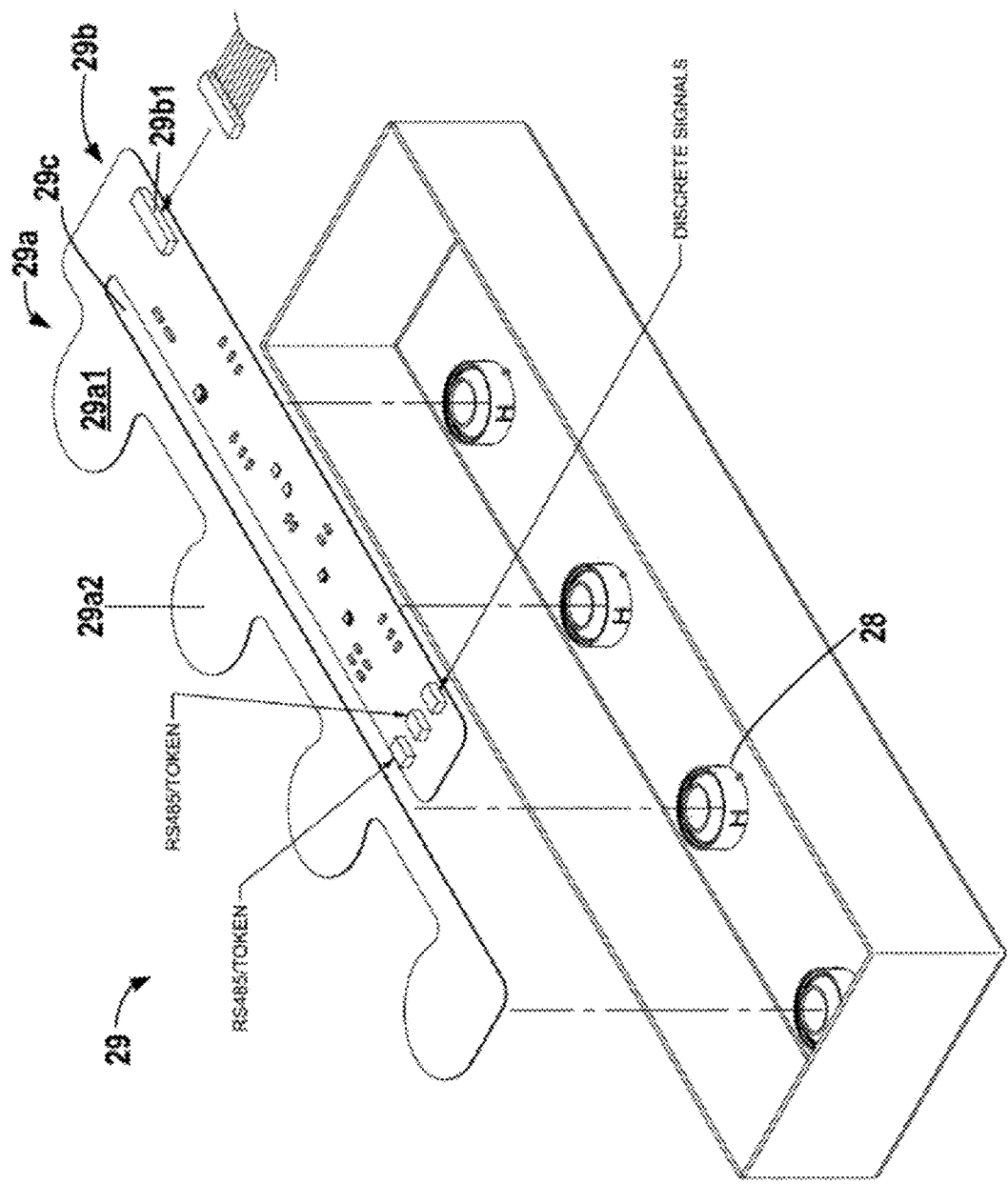
FIG. 19A is a top pictorial exploded perspective view of an embodiment using a flexible PCB.

FIG. 19A is an exploded perspective view that illustrates the use of a flexible printed circuit board (flex PCB) 29 as a basis for a lighting unit containing light emitting diode (LED) lights 28. The lights 28, for example, are lens fittings which suspend above a head of the passenger from the PSU. The lens fittings, in an illustrative example, may include a bowl-shaped mount and lens integrated with the surface of the PSU as illustrated in LED lights 28 of FIG. 22. The flex PCB 29 is designed in a manner that keeps the components in a relatively tight packing space and on a single PCB, yet significantly thermally isolates the LEDs from the circuitry by the use of a U-shaped channel 29c that segregates the PCB 29 into an LED portion 29a, and a control circuitry portion 29b. The LED includes an LED extension portion 29a1 that extends laterally and includes the LED 29a2 itself.

Figure 20:
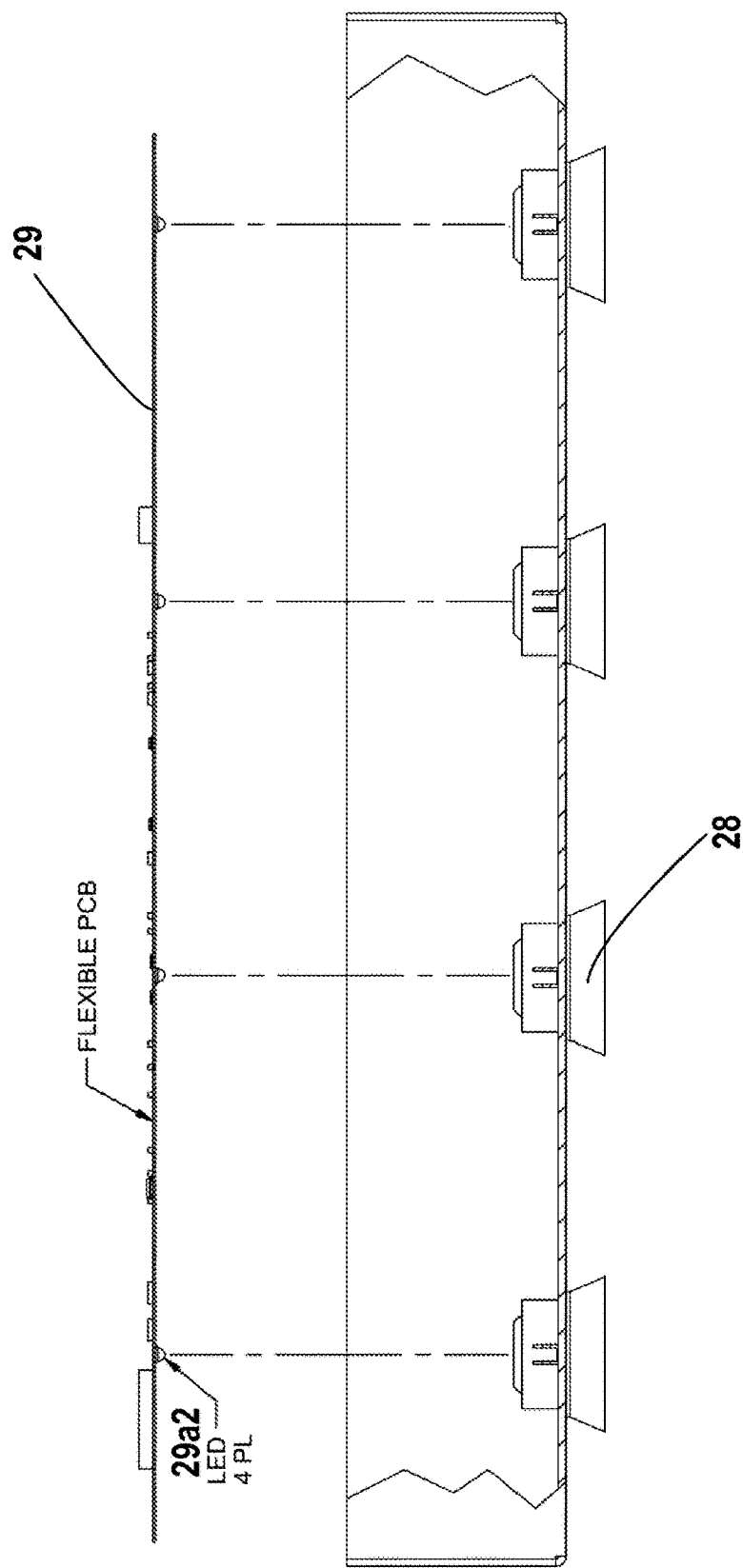
FIG. 20 is an exploded side view of the embodiment shown in FIG. 19.

The control circuitry portion 29b includes a connector that provides the PCB 29 power and control signals, and circuitry for communicating with and controlling the LEDs 29a. FIG. 20 is an exploded side view of the LED lights 28 with flex PCB 29. As illustrated, each LED 29a is provided above an individual lighting base unit 28 (e.g., lamp mount with lens).

Figure 26:
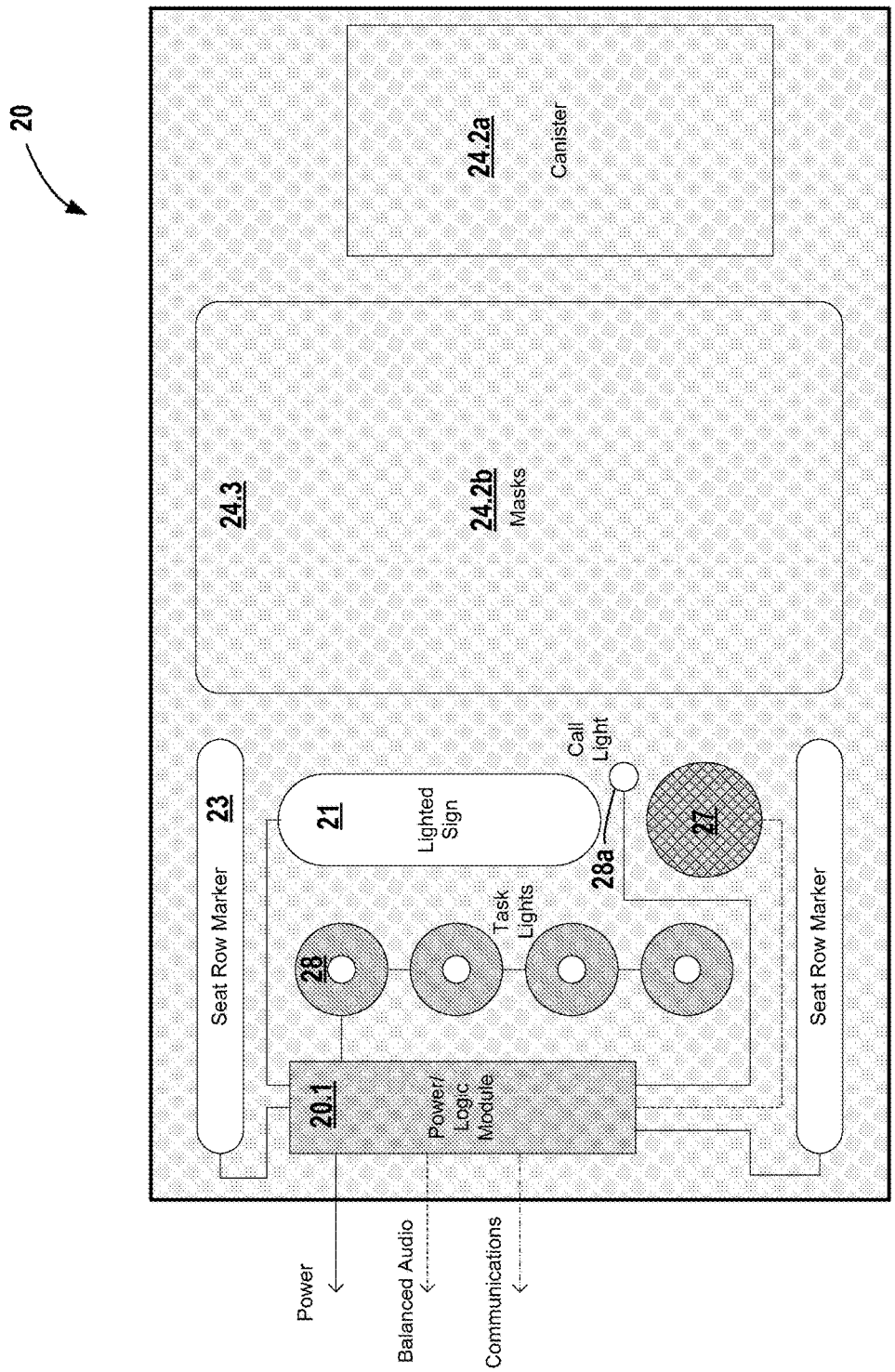
FIG. 26 is a pictorial bottom view of an embodiment of the PSU that includes the power/logic module.

In some implementations, in addition to circuitry for communicating with and controlling the LEDs 29a, the control circuitry portion 29b of the flex PCB 29 includes control circuitry for controlling additional aspects of the PSU. For example, turning to FIG. 10, the control circuitry portion 29b may include control circuitry required for the PSU controller 20.1, including control features of the oxygen controller 24.1 as well as the lighting power supply and controller 20.1. In addition, the control circuitry portion 29b may include control circuitry for controlling a speaker 27 (as illustrated in FIGS. 21, 22, and 26) or integrated speaker light units 200 (as discussed in relation to FIGS. 27 to 30).

In mounting the flex PCB 29 over the lights 28, in some embodiments, a number of clips may be provided within the mounting box for snapping the PCB 29 into place. In further embodiments, the flex PCB 29 may be received in two or more mounting grooves, for example within opposing sides of the mounting box, for mounting the PCB 29 over the lights 28. In additional embodiments, rather than a mounting box, the flex PCB 29 may mount over additional features, such as a speaker system (discussed in greater detail below in relation to FIGS. 28A through 30).

Figure 19B:
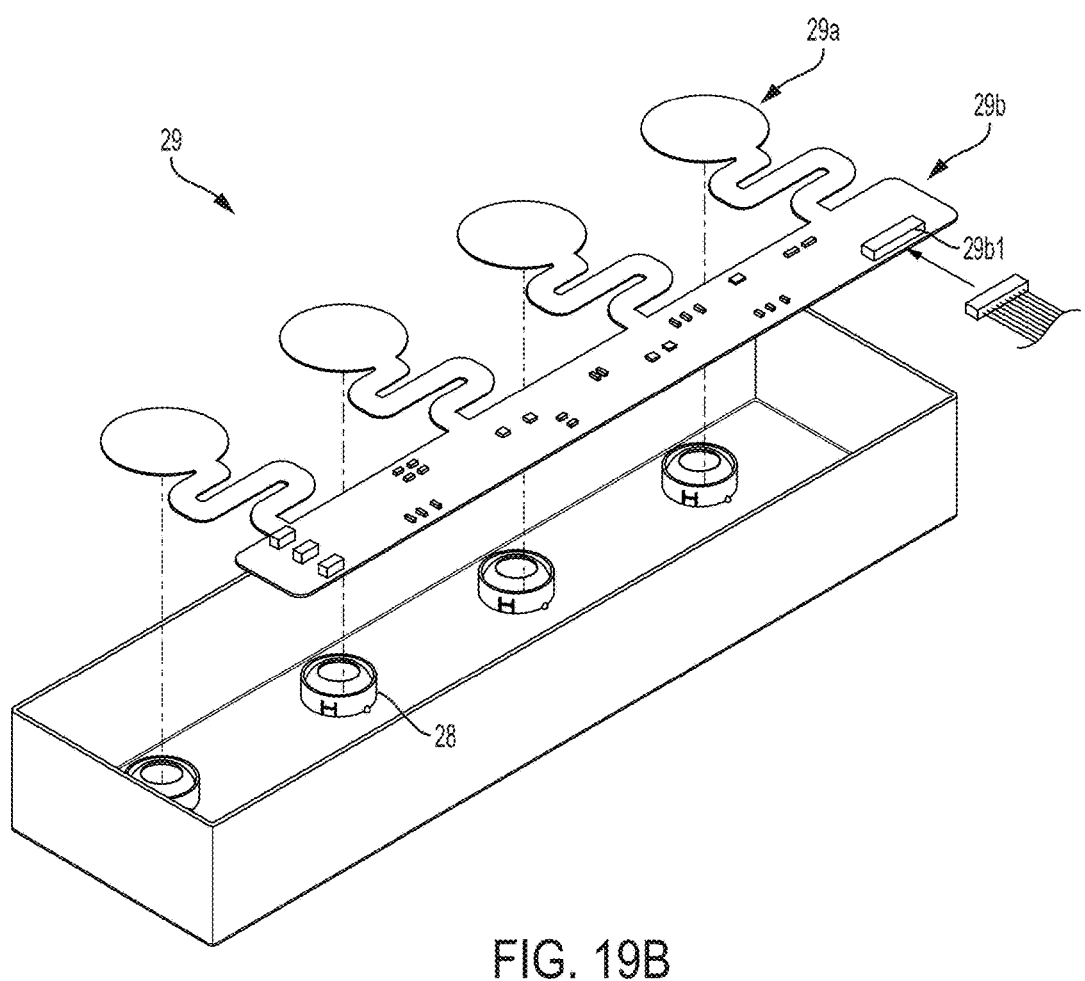
FIG. 19B is an illustration of another exemplary embodiment of a flexible PCB.
Figure 19C:
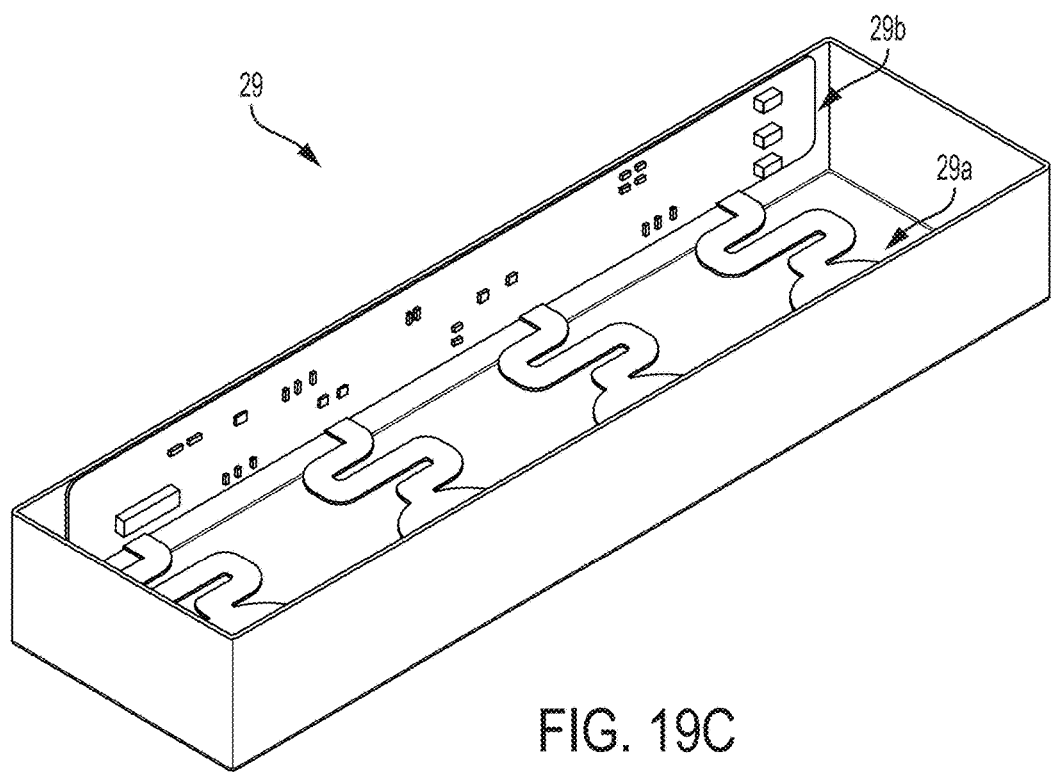
FIG. 19C is an illustration of an exemplary mounting configuration of a flexible PCB.

Depending upon the complexity of the control circuitry of the control circuitry portion 29b, in some embodiments, the flex PCB 29 may be designed with additional control circuitry sections or otherwise shaped to fold and mount around additional components of the PSU Turning to FIG. 19C, in some embodiments, the flex PCB 29 can fold or curve such that the control circuitry portion 29b is mounted substantially perpendicular to the LEDs 29a, for example to allow for mounting within a significantly narrower mounting box. In another example, regions of the control circuitry portion 29b may fold over or roll within other regions of the control circuitry portion 29b to utilize available volume within the PSU. For example, in configurations including integrated speaker light assemblies, the volume of space formerly housing a conventional speaker may be filled in part with flexible PCB control circuitry.

In further embodiments, rather than having the channel 29c, the LEDs 29a may be segregated from the control circuitry portion 29b individually along flex PCB tethers. For example, turning to FIG. 19B, a number of LEDs may be separated from the control circuitry portion via "octopus leg" tethers which squiggle or curve to provide a thin and flexible connection between the individual LEDs and the control circuitry portion 29b.

Although described as including a single LED 29a per light 28, in other embodiments, multiple LEDs can be configured upon each of the LED carrying pads 29a. In a particular example, dual light LEDs may be designed upon the flex PCB 29 to provide for variable adjustment between a warm lighting tone to a cool lighting tone, allowing the lighting to correspond, in some examples, with sunlight coming through the windows or a current cabin lighting configuration. The PSU, for example, may be designed with a photosensor such as a photodiode or photoresistor, to determine present lighting conditions and to provide controls to the LEDs 29a to adjust lighting tone accordingly. In further embodiments, multiple LEDs may be configured upon a given LED carrying pad 29a for providing a range of color options to the passenger (e.g., "mood lighting").

Various configurations for the PSU 20 are envisioned that offer a range of feasible architectural solutions for the lighting requirements including a unique integrated speaker approach for PSU panels 20. These can reduce part numbers, leverage common parts, and support all uses in the cabin including passenger seating areas, attendant seating areas, galley work areas, crew rest areas, cross aisle areas and in the lavatories as required. In summary, design solutions include: variations on a traditional architecture, a centralized architecture, a centralized architecture with integrated speaker, and a centralized rib or group architecture. These architectures provide LED based lighting solutions that leverage traditional as well as modular line replaceable unit (LRU) task/reading light technologies and solutions.

In the variations on the traditional architecture, all of the lights may be individual LRUs and hence are vertically integrated components or they may alternatively leverage modular technology methods for all lighting applications. The modular approach has significant merits including enabling increased commonality of subassemblies, greater flexibility in manufacturing, easy removal/installation on the assembly line or in the field. Additionally, these lights can have all of the benefits of new LED technology including: smooth on/off transitions and optional dimming; multiple color temperatures, color rendering index (CRI) and dispersion angle options; and improved reliability and mean time between failure/mean time between unit replacement (MTBF/MTBUR).

Furthermore, the variations on the traditional architecture can support an existing style OEU 100 and/or PSU 20, power and control feeds or other controllers that individually interface to each PSU/LRU. This requires a separate power run for each light, sign, marker, etc. Signals are discrete and may include some form of communications (TIA-485 or CANbus). The LED task/reading lights and other LEDs lights can be designed to support an 11.4 VAC/VDC—30 VAC/VDC input range or other input range as required. Each LRU may require its own power supply to interface with the power bus. An optional 115 VAC, 400 Hz style task/reading light can be provided and would require a separate power supply that may be incorporated in external electronics.

Figure 25:
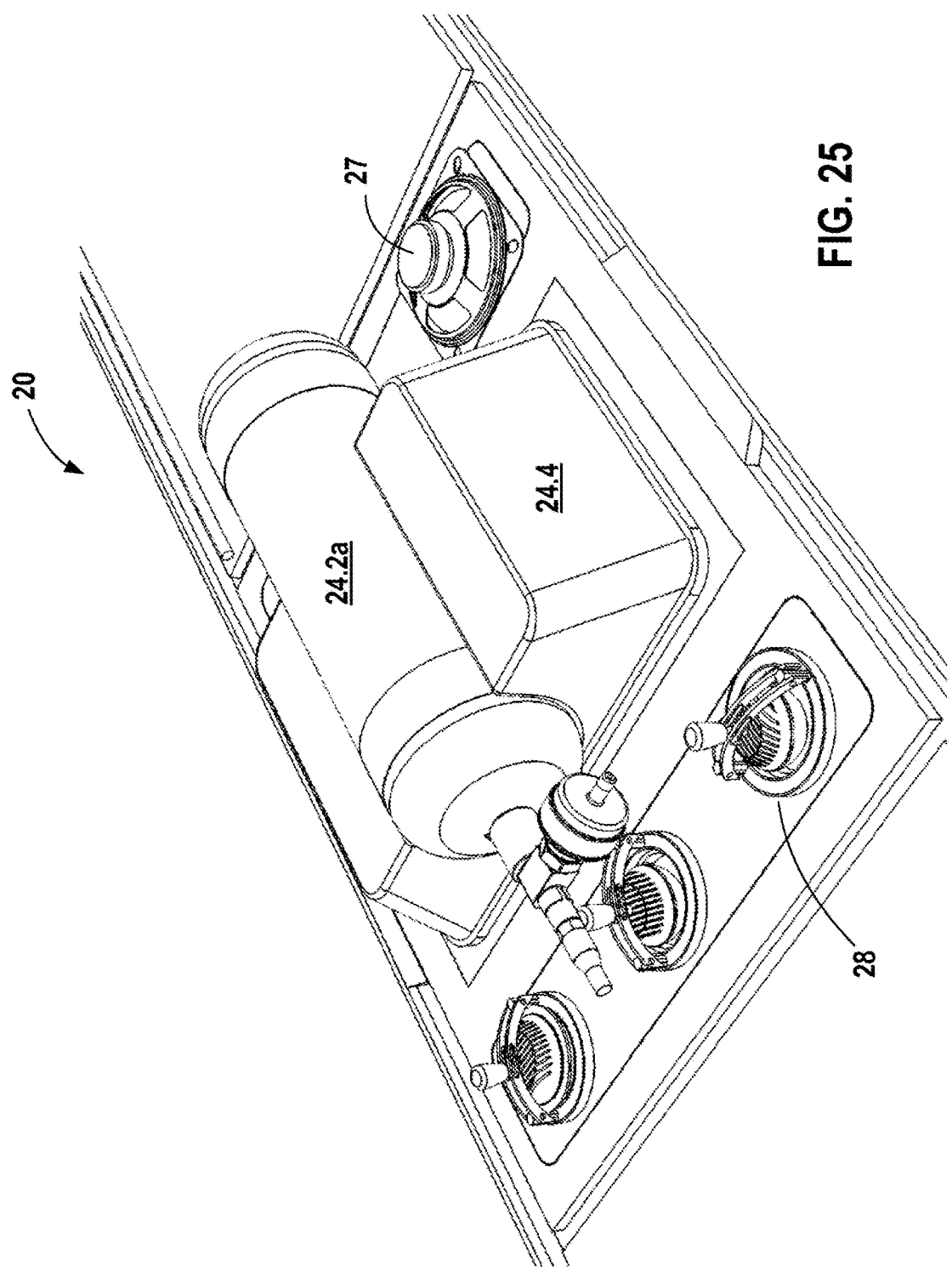
FIG. 25 is a pictorial bottom view of an embodiment of the PSU.

FIG. 25 is a bottom pictorial view illustrating placement of the various PSU components, along with example dimensions for the PSU. As can be seen in FIG. 25, the task lights 28 occupy a leftmost position, and the oxygen canister 24.2a a rightmost position. The oxygen masks 24.2b (above the panel) are located to the left of the oxygen canister 24.2a, and the lighted sign/display 21, speaker 27, and call light 28a, are located to the left of the masks 24.2b.

Figure 21A:
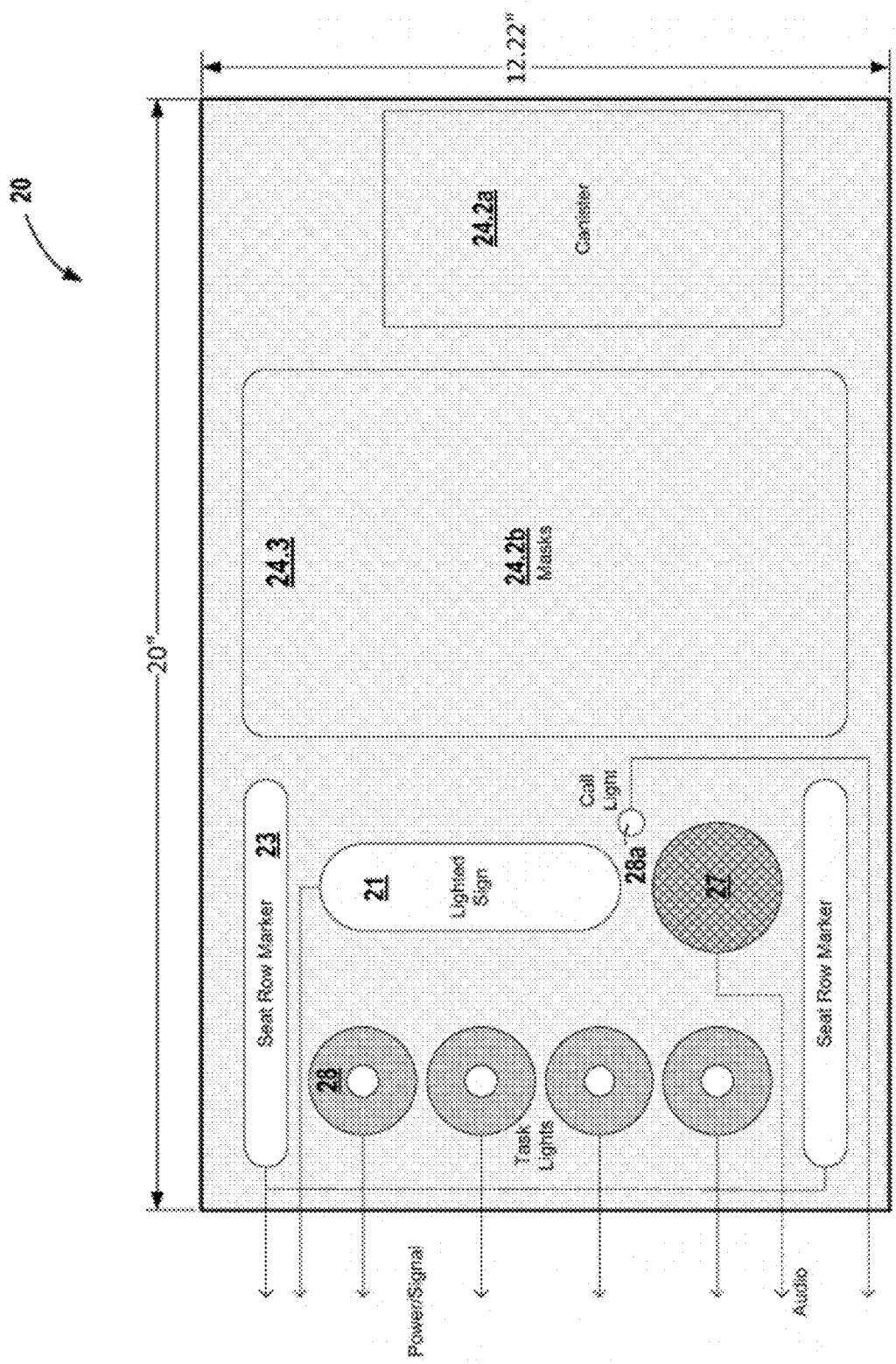
FIG. 21A is a pictorial perspective bottom view of another embodiment of the PSU.
Figure 22:
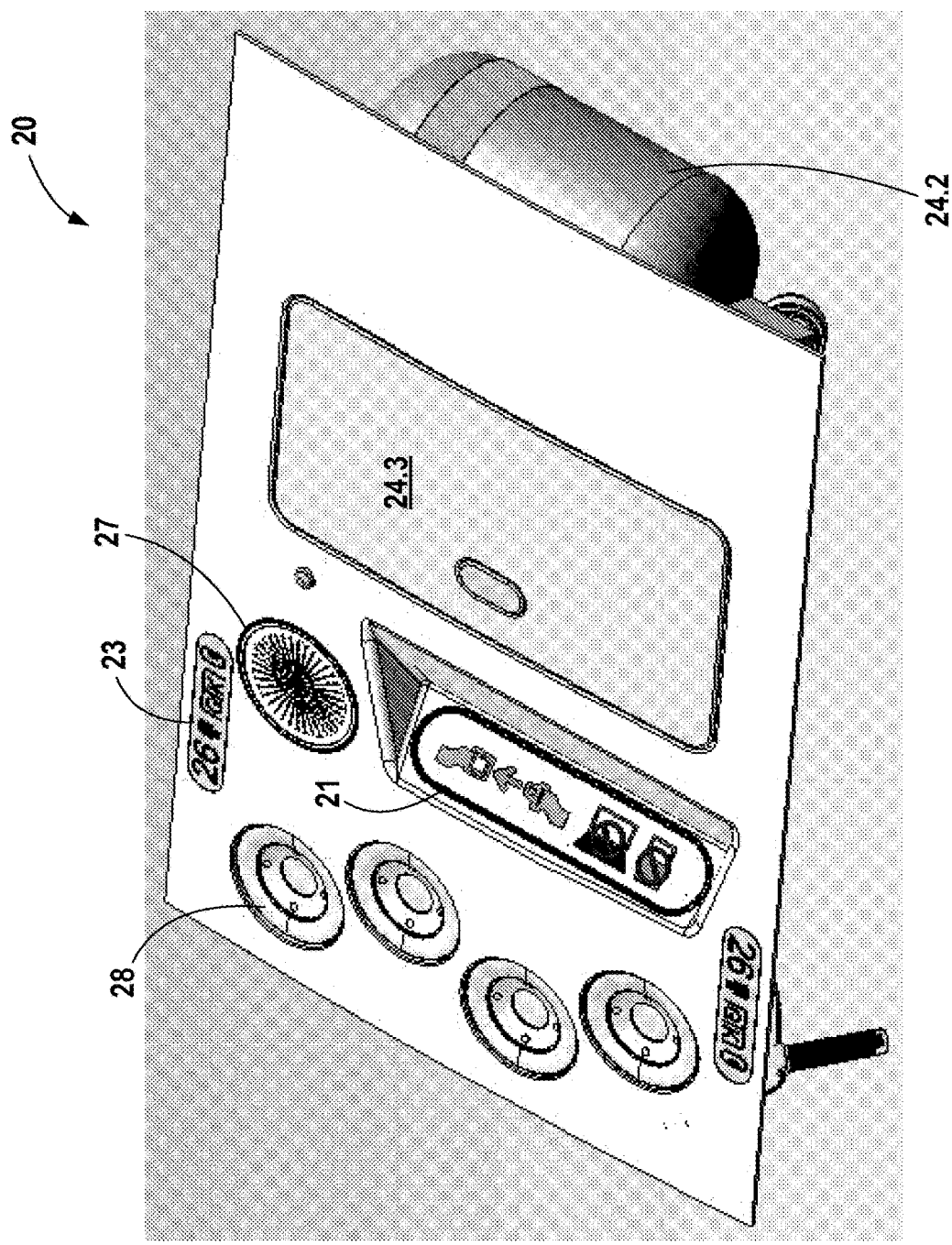
FIG. 22 is a pictorial perspective top view of an embodiment of the PSU.

FIG. 21A is a pictorial perspective bottom view of the modified traditional embodiment in which the PSU has a generally flat bottom surface with the exception of the display 21, which may protrude from the bottom surface for easier viewing. This design shows the location of an oxygen mask door panel 24.3 and an oxygen canister 24.2 located at one end of the PSU 20. FIG. 22 is a detailed perspective top view illustrating a configuration of the various PSU components.

Figure 21B:
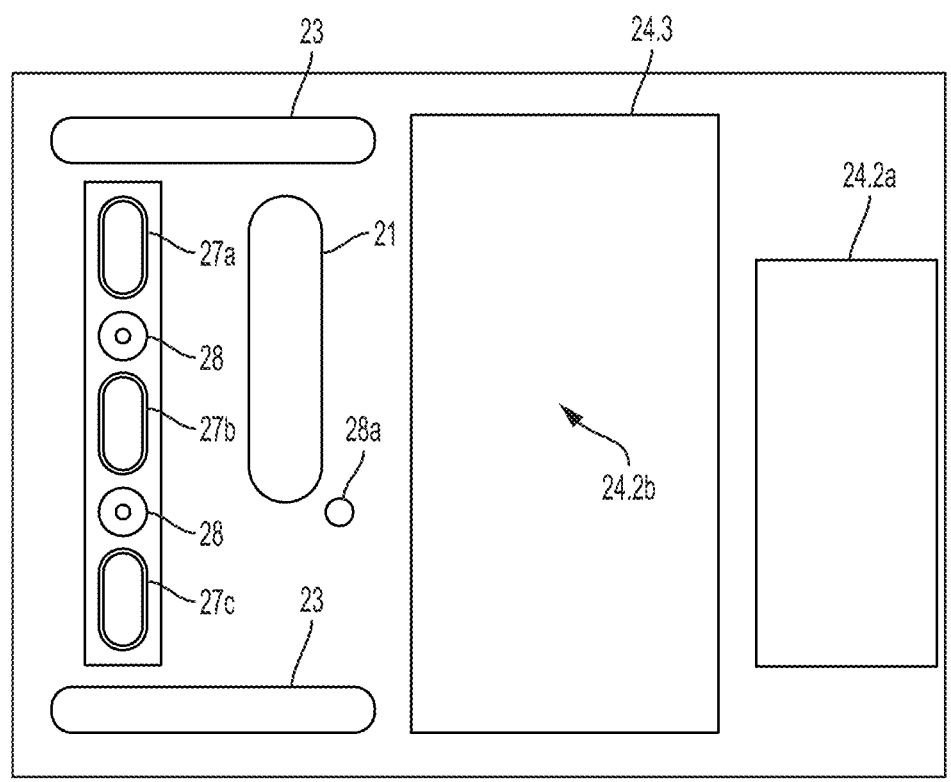
FIG. 21B is an illustration of an example embodiment of a PSU including multiple mini speakers.

FIG. 21B illustrates an example feature layout of a PSU including mini directional speakers in lieu of the single speaker 27 of FIG. 21A. The speaker system of the PSU, in some embodiments, provides individual audio feeds of flight attendant and pilot messages to the passengers seated beneath the PSU. These messages may be difficult to discern in conventional aircraft deployments, due to distance from speakers, lack of directionality of speakers to passengers, background noise, and limitations of building conventional speakers into the cramped environment of the conventional PSU. For example, known vehicle speakers typically are old large paper cone type speakers, which require large amplifiers. Such speakers are not tuned for optimal sound quality. The speaker cone is heavy and not ideal for high frequency response, which is important for intelligible audio. Furthermore, a conventional paper cone speaker takes up a large volume above it as well as a large footprint on the face of the PSU.

Conversely, a miniature speaker ("mini-speaker") has a higher frequency response because the cone is smaller and lighter than traditional vehicle speaker designs. A mini-speaker can use a small point-of-load amplifier, as opposed to a large amplifier that would be needed to drive the larger traditional speaker. The small amplifier can receive analog audio data or digital data, and in either case can be uniquely adjusted for each user. If a digital signal is used, digital signal processing (DSP) and further processing/enhancements of the audio can be done. Such processing can include equalization and phase correction (to the extent that neighboring speaker outputs may be undesirably combined with the current speaker).

As illustrated, FIG. 21B includes alternating mini-speakers and LED light modules. In some embodiments, each mini-speaker is directionally enhanced to deliver sound to a particular passenger in a passenger group. The embodiment illustrated, for example, may include two reading lamps 28 for a two-passenger seating group and three mini speakers 27*a*, 27*b*, 27*c* directed to provide sound to the two-person seating group. The output of the three mini-speakers 27*a*, 27*b*, 27*c*, for example, may be combined for increased richness of output. In other embodiments, each individual passenger may be allocated an individual mini-speaker and an individual reading light module. Each audio output to each speaker horn, similar to each LED, may be presented upon a particular flexible PCB pad or tether such as the flexible PCB regions described in relation to LEDs 29*a* of FIGS. 19A and 19B.

In some embodiments, the audio signal to the mini-speakers 27*a*, 27*b*, 27*c* is directionally enhanced based in part upon a distance of the passengers to the speakers. In a deployment where an individual mini-speaker is allocated to each passenger seat arranged beneath the PSU, for example, the window side passenger may be further away from the PSU unit than the center positioned passenger. The speaker 27*c* closest to the window side passenger may be directionally adjusted to compensate for this increased distance. Further, in some implementations, a signal from a passenger seat indicative of current recline position may be provided to the PSU such that the speaker output of individual mini-speakers 27*a*, 27*b*, 27*c* may be adjusted based upon an increased distance between the given passenger and the PSU due to recline angle.

In other embodiments, the audio signal to the mini-speakers 27*a*, 27*b*, 27*c* is enhanced based upon perceived ambient noise in the region of the PSU or passengers. For example, a microphone mounted on the PSU or proximate passenger seating beneath the PSU may determine an ambient noise level of the immediate region. For example, the speaker output for a passenger row positioned above the engine may be adjusted differently than the speaker output for a passenger row positioned near a divider section of the passenger cabin. In a particular example, noise cancellation logic may adjust the audio signal based upon perceived noise within the immediate region of the aircraft cabin.

In some implementations, the audio signal to the mini-speakers 27*a*, 27*b*, 27*c* is adjusted for a combined, richer audio experience. For example, as illustrated, three mini-speakers 27*a*, 27*b*, 27*c* are mounted with two light fixtures 28 between adjacent mini-speakers 27*a*, 27*b*, 27*c*. In this example, the PSU may be designed for a 2-passenger seating row, such as a first class passenger row or a passenger row within a narrow body aircraft. For a richer, fuller sound experience, for example during an instructional video or other airline advertisement, sound quality of the three mini-speakers 27*a*, 27*b*, 27*c* may be combined by the audio control circuitry.

Control and handling of the audio signal, along with generation of the audio output to an associated loudspeaker horn, is provided on a shared flex PCB, in some embodiments, as discussed in relation to FIGS. 19A and 19B. The flex PCB, for example, may include one or more amplifiers, filters, noise cancellation logic, and/or other digital sound processing logic to supply audio to passengers via the mini-speakers 27*a*, 27*b*, 27*c*. The flex PCB, in some embodiments, is mounted above and/or proximate to the mini-speakers 27*a*, 27*b*, 27*c* and lights 28 of the PSU. In other examples, a portion of the flex PCB circuitry may be mounted in a separate region of the PSU. For example, the flex PCB may coordinate control signals for an oxygen system, aisle based lamp indicators, and passenger control elements such a cabin attendant buttons. As such, a portion of the flex PCB circuitry may be disposed in a more centralized location proximate these additional PSU features.

FIG. 26 illustrates a design using the centralized architecture. The lights for this approach leverage the same technologies deployed in the architecture discussed above while eliminating redundant power and control circuitry. Moreover, this integrated architecture may offload all power supply functionality, control logic, and optionally oxygen system functionality onto one PC board, the power/logic module 20.1. The power/logic module 20.1 may be implemented as a flexible PCB, providing more creative mounting options and distributed processing options than a conventional circuit board, while avoiding damage to circuitry through the flexible nature of the substrate. This power/logic module can be centrally located in the PSU 20 or located at one side, as illustrated in FIG. 26, and allows for a single point of entry for power, control, and audio. The advantages for this configuration include:

a. task/reading lights 28, seat row markers 23, signage 21, and call light 28*a* internal power supplies are not needed, leading to possible lower weight and costs;

b. power supply front end protection devices are designed once and are common across the entire PSU 20;

c. external shipside cable management and power quality certification can be leveraged, leading to possible lower PSU cable weight and costs;

d. a power supply that can support an 11.4 VAC/VDC—30 VAC/VDC input range, as required or optional 115 VAC, 400 Hz input;

e. the ability to power other systems, such as washlighting, USB charging, etc.;

f. use a single input connector per PSU 20;

g. provide audio amplification on the power/logic board 20.1 accepting differential audio signal or digital formats;

h. provide a common look/feel in a normalized manner, such as fade in/out transition times or illumination profiles as required; and i. allow advanced occupancy sensing technology to dim lights, adjust volume, etc.

The unified and centralized architecture also enables BIT/BITE simplicity and can leverage a common microcontroller leading to a streamlined RTCA/DO-178/254 documentation process, as applicable.

Regarding the physical construction, the PSU panel is designed to have a simplified modular construction that lends itself readily to kit design components and helps to reduce the part count. The modules may include a lighting module/panel portion 28 (e.g., a 2, 3, 4, or n number of lights to conform to a particular vehicle configuration), an oxygen module 24 that includes the oxygen bottle/canister 24.2a, masks 24.2b, and related hardware, and a sign module 21 that displays signs (seatbelt, etc.) to the user.

The panel may be designed to have a smooth bottom surface when viewed from the bottom (customer view) (see FIGS. 14, 17, 18). In an embodiment, it has a monolithic construction or at least is manufactured to have a surface that is contiguous. In an embodiment, the contiguous surface has a large planar portion. In an embodiment, the sign module portion has a translucent or semi-transparent cover (such a cover could cover the entire lower portion of the panel) so that the illuminated signs can be visible through the cover, but the cover can hide or reduce visibility of components that the customers should not see. This can be achieved by specific positioning of the lighting and other components, the use of a masked coating, which blocks the translucent cover in all areas other than the sign areas. In this way, electronics, masks, oxygen bottles, etc. are not visible to the customers during normal use.

The PSU panel may be designed so that it utilizes a drop hinge or an articulated hinge. This permits the panel to drop away when oxygen masks need to be deployed, yet at the same time retains a clean and uncluttered appearance during normal operation of the vehicle.

Figure 23:
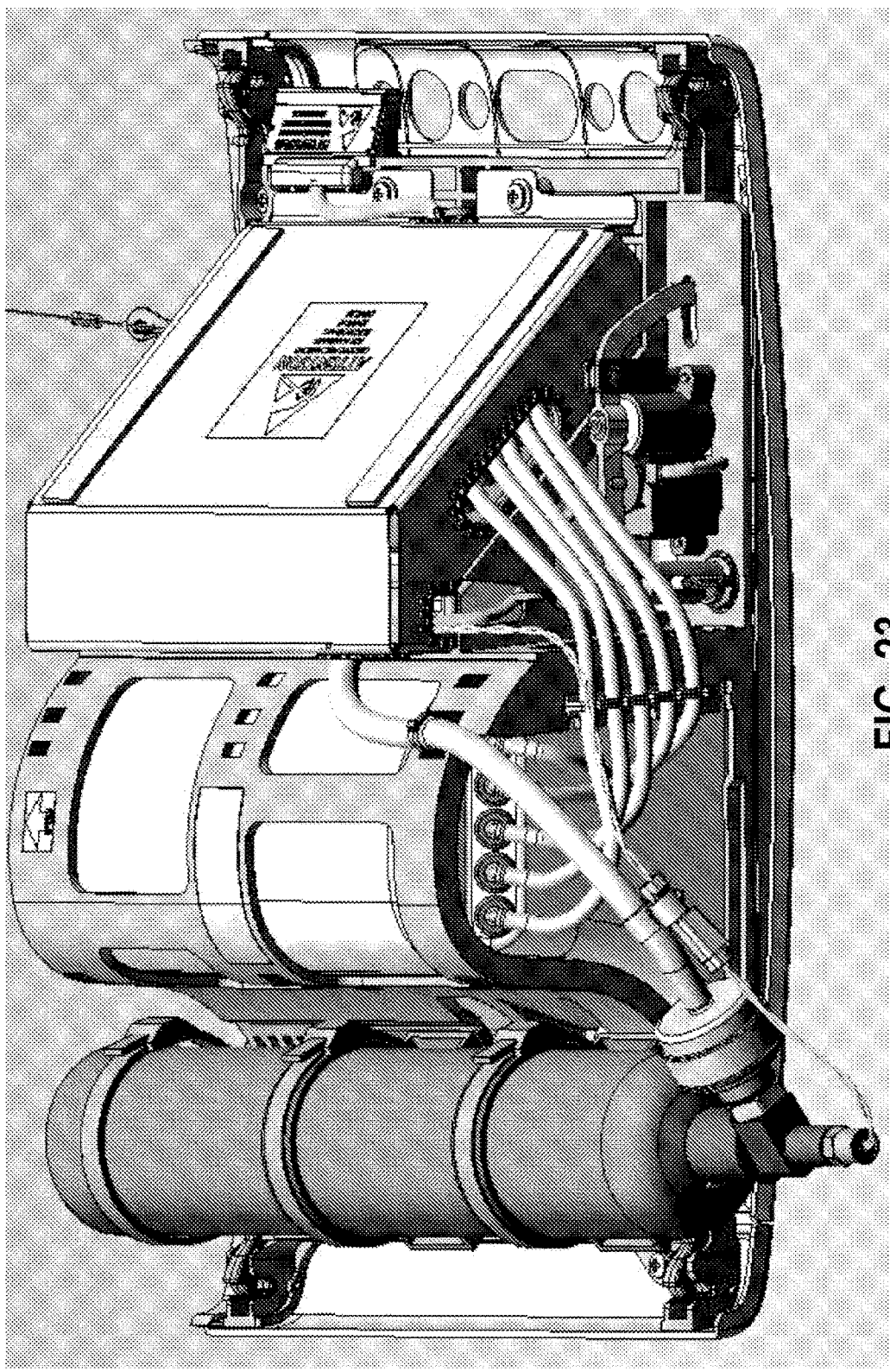
FIG. 23 is pictorial perspective top view of another embodiment of the PSU.
Figure 24:
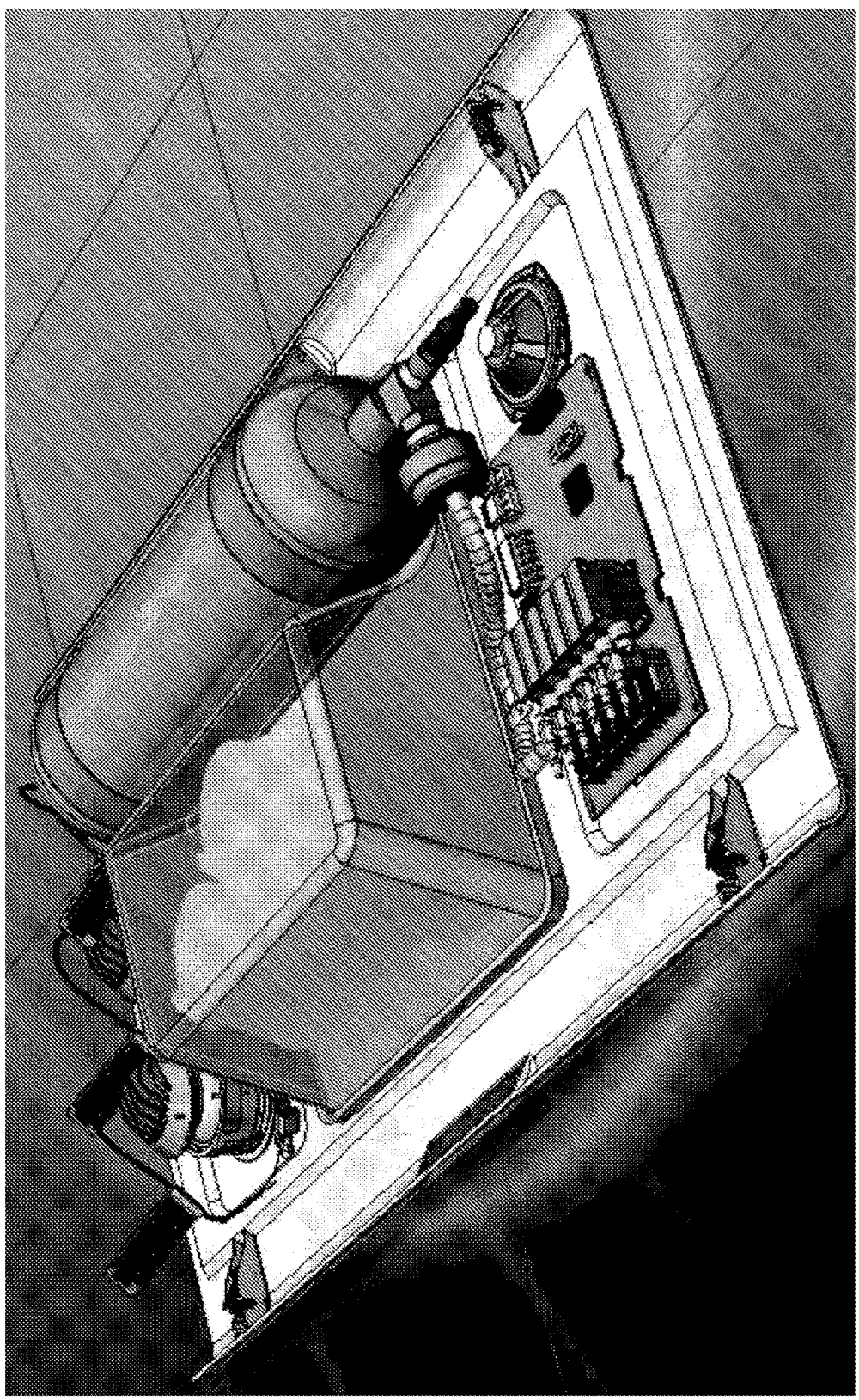
FIG. 24 is pictorial perspective top view of a further embodiment of the PSU.

In certain embodiments (FIGS. 24, 25), the oxygen bottle/canister 24.2a can be turned 90 degrees with respect to the other electronic components and orientation with respect to the seats (the axial direction of the cylindrical canister is perpendicular to the viewing direction of the seat locations) to make maximum use of available space. In other embodiments (FIGS. 22, 23), the axial direction is parallel to the viewing direction). In an embodiment (FIG. 24), a bottle mount 24.4 may be provided on the mask housing. This can permit a maximum storage situation when the masks are packed, while at the same time capable of being deployed.

Centralized Architecture with Integrated Speaker

Figure 27:
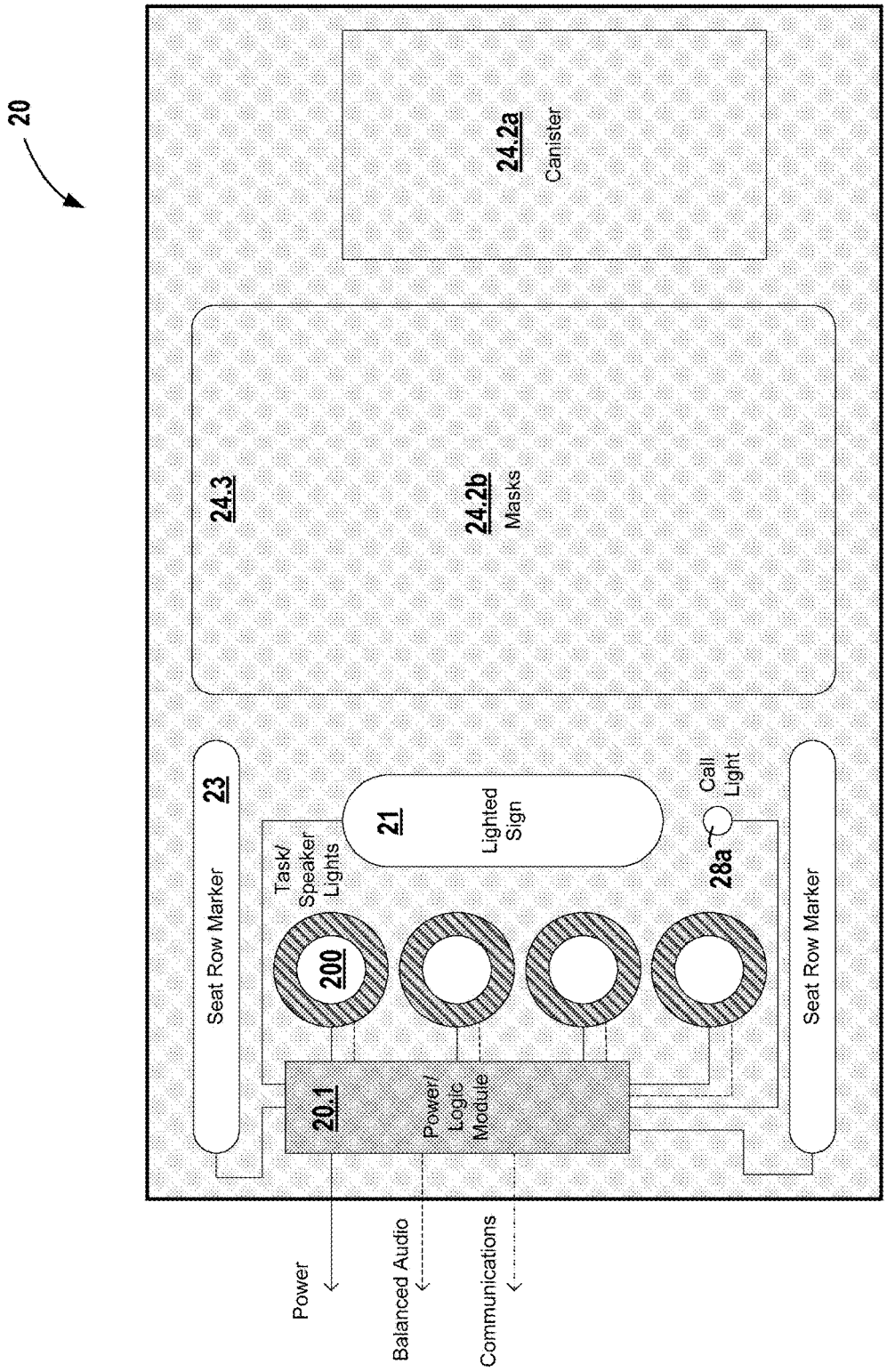
FIG. 27 is a pictorial bottom view of an embodiment of the PSU that includes the integrated speaker-light component.

FIG. 27 illustrates an architecture that utilizes a centralized power and control system within each SU along with a vertically integrated task/light and speaker. As discussed above in relation to FIG. 21B, vehicle speakers typically are old large paper cone type speakers, which require large amplifiers. Such speakers are not tuned for optimal sound quality. The speaker cone is heavy and not ideal for high frequency response, which is important for intelligible audio, and such speakers take up space on the PSU 20 (where real estate is valuable). Furthermore, the speaker takes up a large volume above it (meaning other things cannot be mounted in this volume).

New LED technology is much more efficient than traditional incandescent or fluorescent lighting. LEDs themselves, along with drive circuitry, can be shared with circuitry used to drive the speaker which frees up space in the real estate formerly occupied by both the light and the speaker. In one embodiment, the speaker is vertically integrated into the reading light so that they can share a common housing.

Since the reading light is already directional and is usually pointed at the user, this configuration benefits the inclusion of the speaker as well. Having individual speakers that are directed to the user means that the size can be reduced (such a speaker can be, e.g., 2" in diameter). In further embodiments, the size of the individual speakers may range between about 2" to about 4" in size. Additionally, although mentioned as a diameter, it should be noted that, in a number of embodiments, the speaker horn is not round in shape, such that 4" may be the greatest width of an oblique or rectangular speaker horn.

Additionally, a speaker of this size has a higher frequency response because the cone is smaller and lighter than older traditional vehicle speaker designs. This is horn loaded and is tuned to treble, which helps with voice intelligibility, giving a nice clean sound. This speaker can use a small point-of-load amplifier, as opposed to a large amplifier that would be needed to drive the larger traditional speakers. The small amplifier can receive audio data or digital data, and in either case can be uniquely adjusted for each user. If a digital signal is used, the digital signal processing (DSP) and further processing/enhancements of the audio can be done. Such processing can include equalization and phase correction (to the extent that others' speaker outputs may be undesirably combined with the current speaker). However, in general, the small speakers being directional means that a passenger typically will not hear their neighbor's speaker, and will not get multiple phases of their sound (delay).

This approach would have the same features, benefits and technologies deployed in the systems described above as well as providing added value and functionality by incorporating high a quality speaker into the task/reading light assembly. The value this provides includes: weight savings, and space savings for other PSU and oxygen system components. A portion of the mass and volume savings provided by switching from conventional lamps to LED lighting is replaced by a speaker horn of the integrated lighting and speaker unit. For example, the speaker horn may be sized to take up a similar volume as a heat sink used in conventional lighting systems, such that the speaker/LED combination has a volume similar to the volume of a conventional electric lamp fixture and fits comfortably within the prior PSU housing.

In some examples, replacing conventional lighting units and a conventional speaker with integrated LED light and speaker units reduces weight of a PSU by at least a half pound, between one and two pounds, or more than two pounds due to the removal of the paper cone, large amplifier, and conventional lighting heat sinks. Replacing conventional lighting units and a conventional speaker with integrated LED light and speaker units frees up volume within a PSU unit, in some examples, of at least 15 square inches, between 15 and 25 inches, between twenty and 30 inches, or over thirty inches. Weight and volume savings, in part, may depend upon a number of lights (e.g., a three-passenger seating group versus a two-passenger seating group), a speaker horn configuration of each integrated lighting and speaker unit, as well as the number of integrated lighting and speaker units total in the reworked PSU design. In some embodiments, only one lighting fixture is configured as an integrated LED light and speaker unit, while remaining lighting fixtures are LED lighting fixtures as described, for example, in relation to FIGS. 19 and 20. In further embodiments, multiple lighting fixtures may be integrated into a same speaker horn as described, for example, in relation to FIG. 28B.

The speaker may be located in the back of the light where the heat sink was previously located. It can pass the sound through a throat, and thus it forms a horn that directionalizes the sound. The reading light assembly is levitated within the throat of that horn, and the speaker sound feeds through it. In some implementations, the sound is directionalized; generally aimed in the direction of the reading light assembly (e.g., toward a particular passenger). For example, while a reading lamp may be directed in front of a passenger to illuminate items presented on a tray table, for example, the speaker directionality may be behind this trajectory, closer to the passenger's head. In other implementations, the integrated speaker light assembly is designed to disperse sound across a passenger seat grouping.

In some implementations, the reading light assembly is static. In other embodiments, the housing and lens of the reading light assembly are articulable, for example rotationally and/or in the x/y direction.

FIG. 27 illustrates an embodiment of a PSU 20 design layout, including at least one integrated speaker/task light 200, which saves space on the PSU 20. As illustrated, for example, four integrated speaker/task lights 200 are arranged vertically in a position utilized, in FIG. 26, for four task lights 28. The speaker 27 of FIG. 26 has been replaced by the mini-speaker features of the integrated speaker/task lights 200, providing additional space, for example, for the active display module 21 and the call light 28a.

Figure 28A:
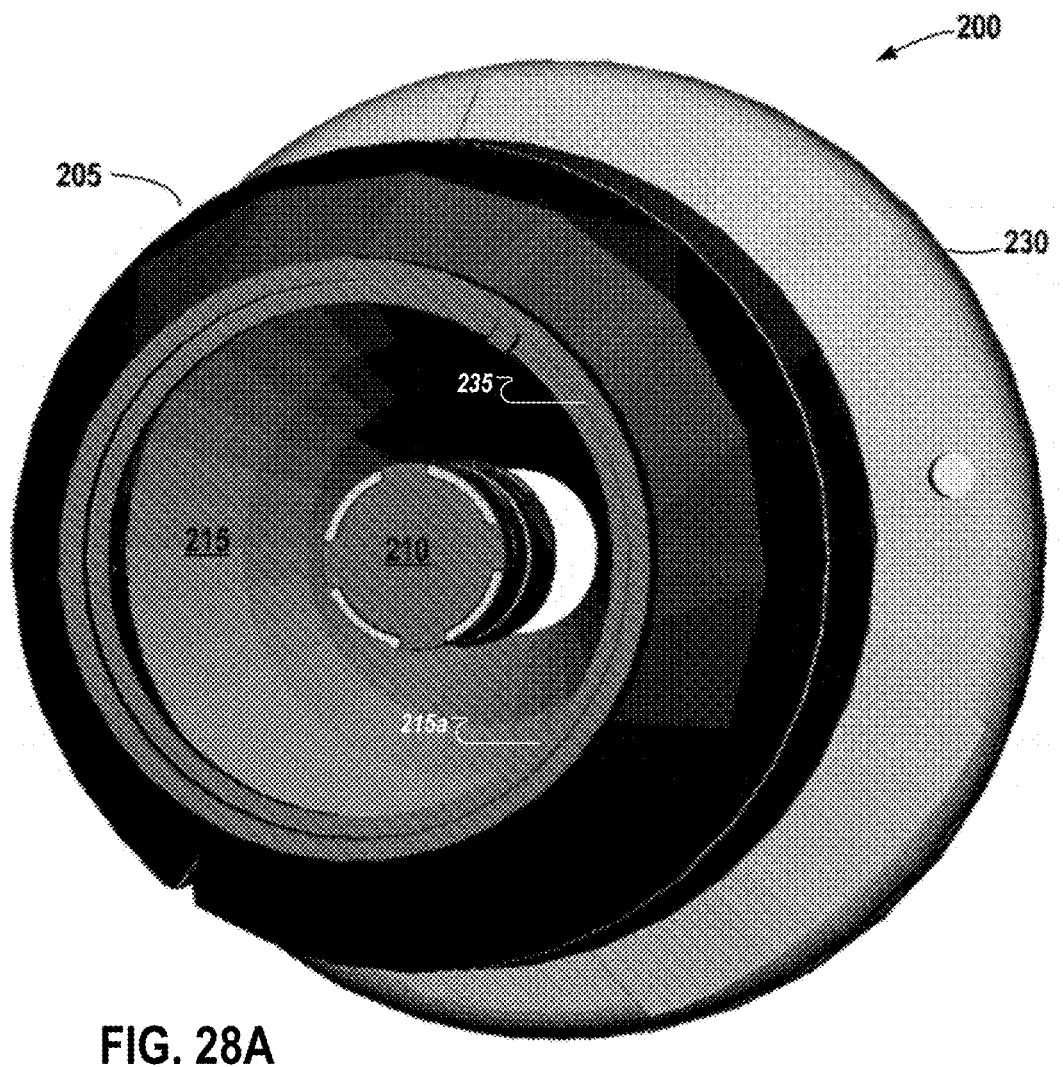
FIG. 28A is a bottom perspective view of the integrated speaker-light component.
Figure 29:
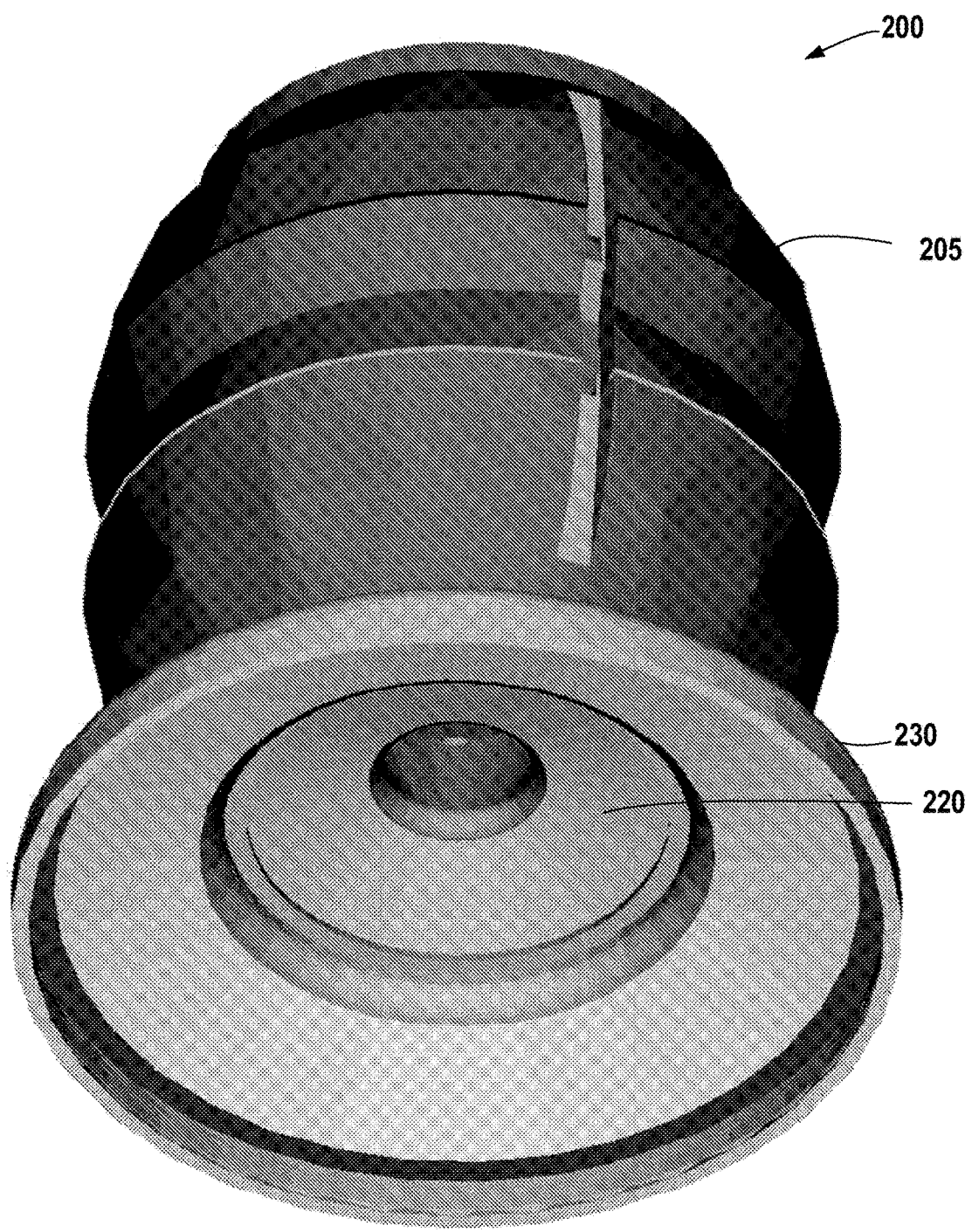
FIG. 29 is a top perspective view of the integrated speaker-light component.
Figure 30:
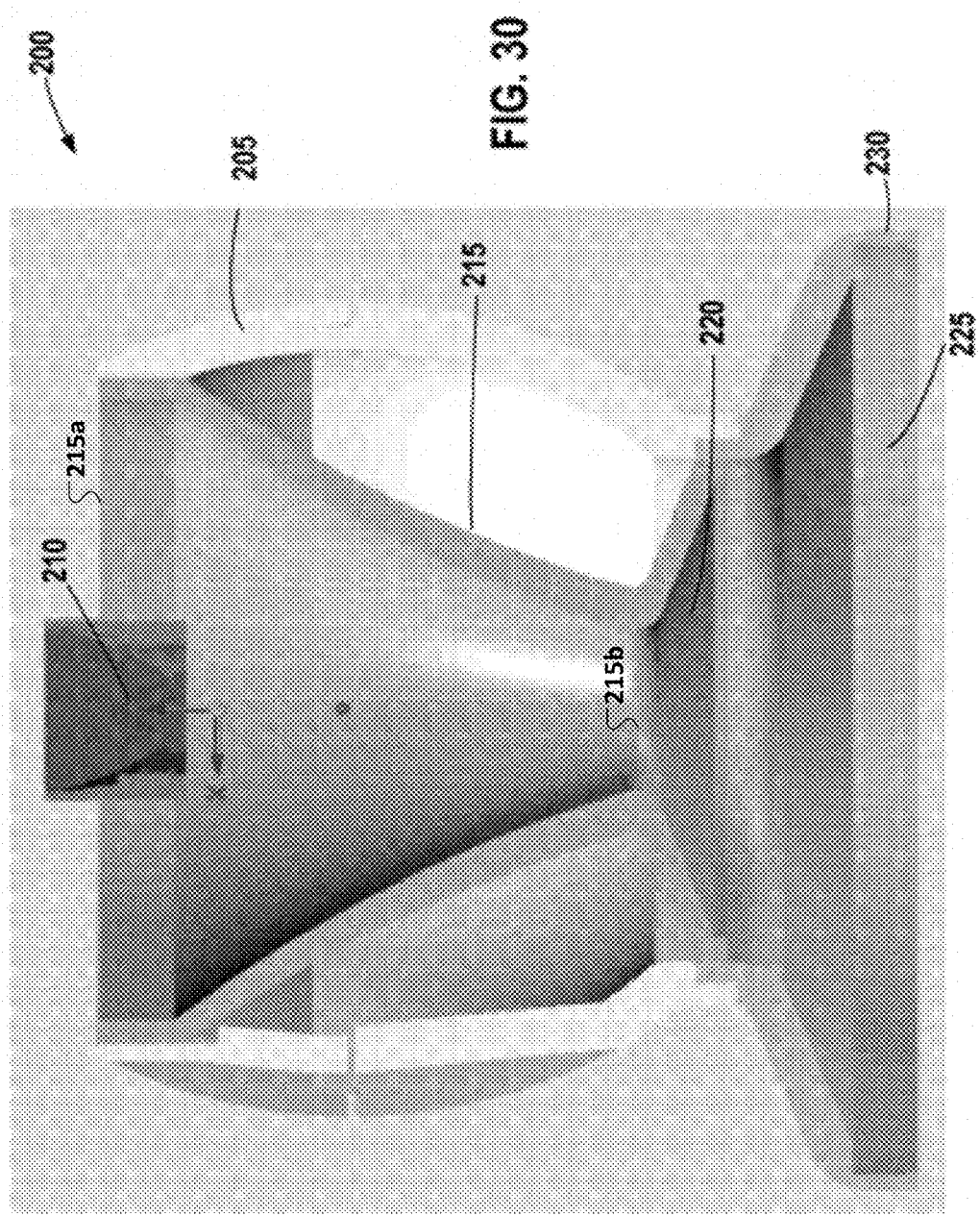
FIG. 30 is a cross-sectional side view of the integrated speaker-light component.

FIGS. 28A, 29 and 30 illustrate a first embodiment of an integrated speaker/task light unit 200. FIG. 28A is a bottom perspective view of the integrated unit 200 illustrating a housing 205 which may be of a truncated spherical form, an LED light module 210, a speaker horn 215, and a mount 230. As illustrated, the speaker horn 215, being generally conical in shape, is surrounded by the housing 205. The housing 205, in some embodiments, is rotatably connected to the mount 230. For example, a passenger may redirect the task light when mounted at the mount 230 to the PSU by rotating the housing 205, thereby redirecting a beam of an LED disposed therein. In other embodiments, the housing 205 is fixedly connected to the mount 230. The housing 205 may be rounded, for example, to allow ample vibration of the horn 215. In other embodiments, the housing 205 may have various shapes to enhance sound quality of the audio stream presented by a speaker 220 (illustrated in FIG. 29).

As illustrated, a housing ring 235 surrounds a mouth 215a of the horn 215. The housing ring 235, in some embodiments, supports a lens. The lens may include apertures to allow sound to travel through the integrated speaker/task light 200 substantially unobstructed. In other embodiments, rather than a lens, the opening of the horn 215 may be covered by a fine mesh covering to protect the horn 215 and the LED 210 within.

In further embodiments, the LED light module 210 is a lens module presented at the surface of the PSU (e.g., extending beyond a mouth 215a of the horn 215), and the housing 205 protects the horn 215 within the PSU while the mount 230 mounts the integrated speaker/task light to an upper surface of the PSU. In this example, the LED of the LED lighting module may be disposed higher in the horn 215, for example within a body of the horn 215 or proximate a throat 215b of the horn 215.

Turning to FIG. 29, a top perspective view of the integrated unit 200 shows, in addition to the mount 230 and the housing 205, the speaker 220 which directs sound into the speaker horn 215. As is shown in FIG. 30, which illustrates a cross-sectional side view of the integrated unit 200, the speaker 220 is positioned above a mouth 215b of the horn 215 and beneath speaker/light electronics 225 which provide an audio signal to the speaker 220. The speaker/light electronics 225, for example, may be disposed within the base 230. The speaker/light electronics 225, for example, provide audio signals to the speaker 220 and control output of the lighting module 210. The speaker/light electronics 225, for example, may be configured as part of a flex PCB, while the LED 210 may be disposed on a flex PCB tether or extension and directed over or dropped within the speaker horn 215 to present the LED 210 proximate mouth of the horn 215a. In a particular example, the speaker/light electronics 225 may include a portion of the control circuitry of the speaker 220 and the LED 210, while remaining control circuitry may be configured upon a separate portion of a flex PCB board, as described, for example, in relation to FIGS. 19A and 19B.

As is shown in FIG. 30, the LED lighting module 210 is floating with the speaker horn 215 while the speaker/light electronics 225 are disposed proximate the speaker 220. Although illustrated as extending beyond the mouth 215a of the horn 215, in other embodiments, the LED lighting module 210 or portions thereof may be disposed centrally within the horn 215 or near the throat 215b of the horn 215.

Figure 28B:
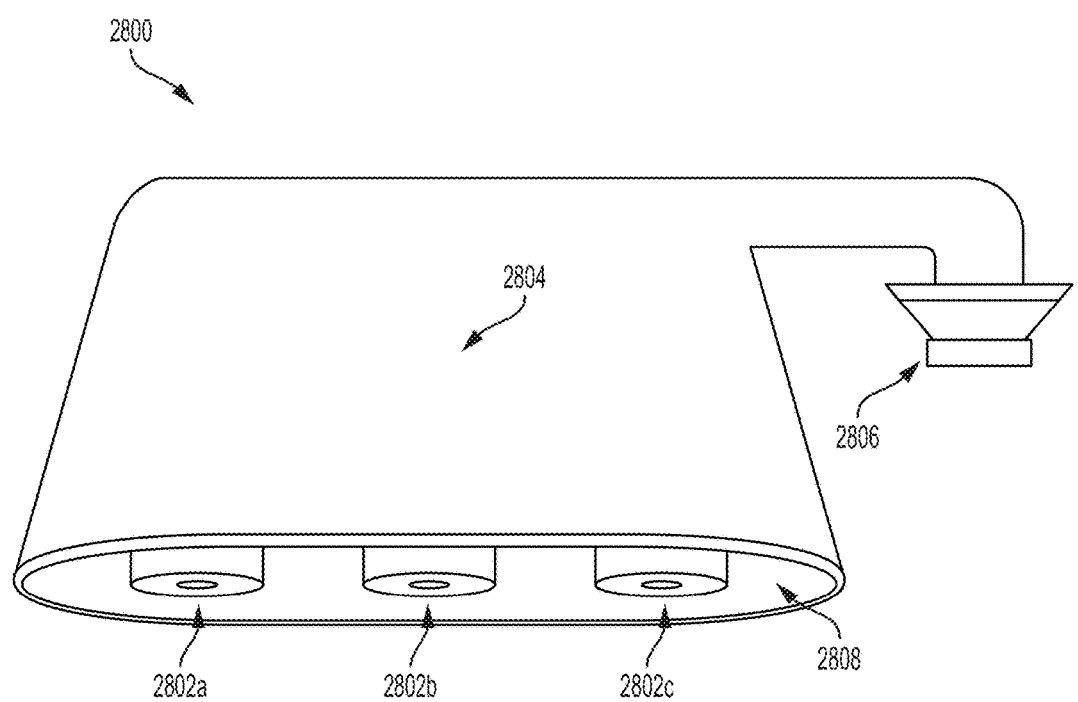
FIG. 28B is an illustration of an example embodiment of an integrated speaker-light component including a manifold horn.

Turning to FIG. 28B, in some embodiments, multiple light modules 2802 may be fed from a single speaker horn 2804 in an integrated speaker-light assembly 2800. For example, an asymmetric speaker horn, such as the manifold speaker horn 2804 design illustrated in FIG. 28B, may be provided to distribute sound across a seat grouping (e.g., a row section served by the PSU). Two or more light modules may be integrated into the asymmetric speaker horn 2804 to utilize the elongate architecture of the manifold horn 2804. Through folding the manifold horn 2804, height of the integrated speaker-light assembly 2800 may be controlled. Other embodiments may include additional/different folding than illustrated, for example to enhance sound quality or to utilize available free space within the PSU to best advantage. As illustrated, a diaphragm end ("throat") 2806 of the manifold horn is curved around a side of a loudspeaker flange ("mouth") 2808 of the manifold horn 2804. Flexible PCB technology is particularly useful in this situation, since the LEDs may be tethered to a flexible PCB lead and fed down the throat 2806 of the horn proximate the mouth 2808, where the lighting modules 2802 (e.g., lenses and housings) are disposed.

Although discussed in relation to PSU task lights, in some examples, the multiple LED lighting module configuration of the integrated speaker-light assembly 2800 may be particularly useful positioned in a region where a row of LED lights is useful for lighting a wider region, for example as mirror lighting within a lavatory monument or as lighting near a galley monument.

Figure 28C:
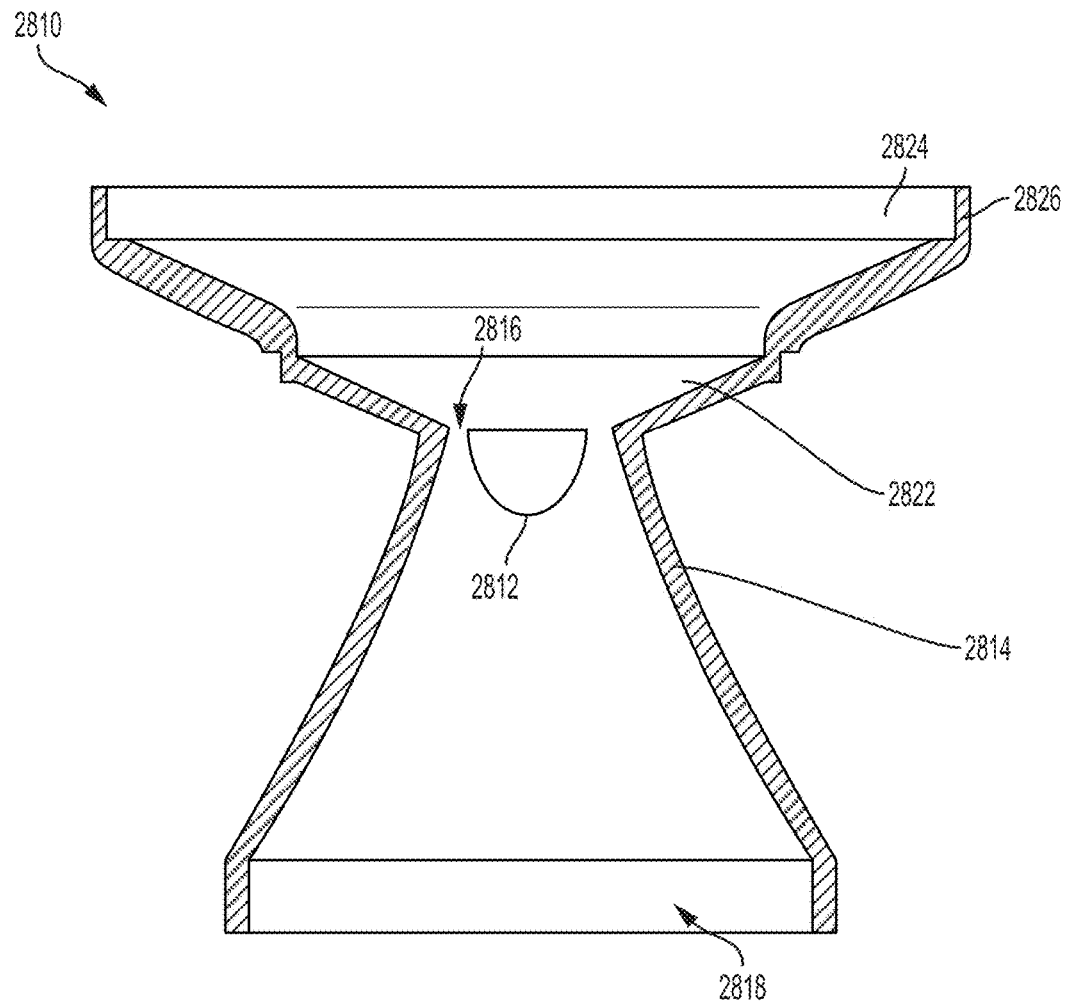
FIG. 28C is an illustration of an example embodiment of an integrated speaker-light component including an alternative LED mounting position.

In some embodiments, as shown in FIG. 28C, a lighting module 2812 may be disposed closer to a throat 2816 of the speaker horn 2814, while the horn 2814 of the integrated speaker-light assembly 2810 extends downwards. For example, the mouth 2818 of the horn 2814 may provide dual functionality as a portion of a lighting housing 2820, for example with a mesh rather than a lens disposed at the mouth 2818 opening to diffuse the light but not muffle the sound from a speaker 2822 fed audio output from circuitry 2824 disposed in a PSU mount 2826 of the integrated speaker-light assembly 2810. In other embodiments, a lens and housing may be disposed at the mouth 2818, while the LED is disposed at the throat of the horn 2814 to conveniently position the LED while avoiding adverse effect on the sound produced by the horn 2814 due, for example, to a tethered LED bouncing within the horn 2814 during turbulent periods (e.g., during times when the flight crew is apt to address the passengers).

Figure 28D:
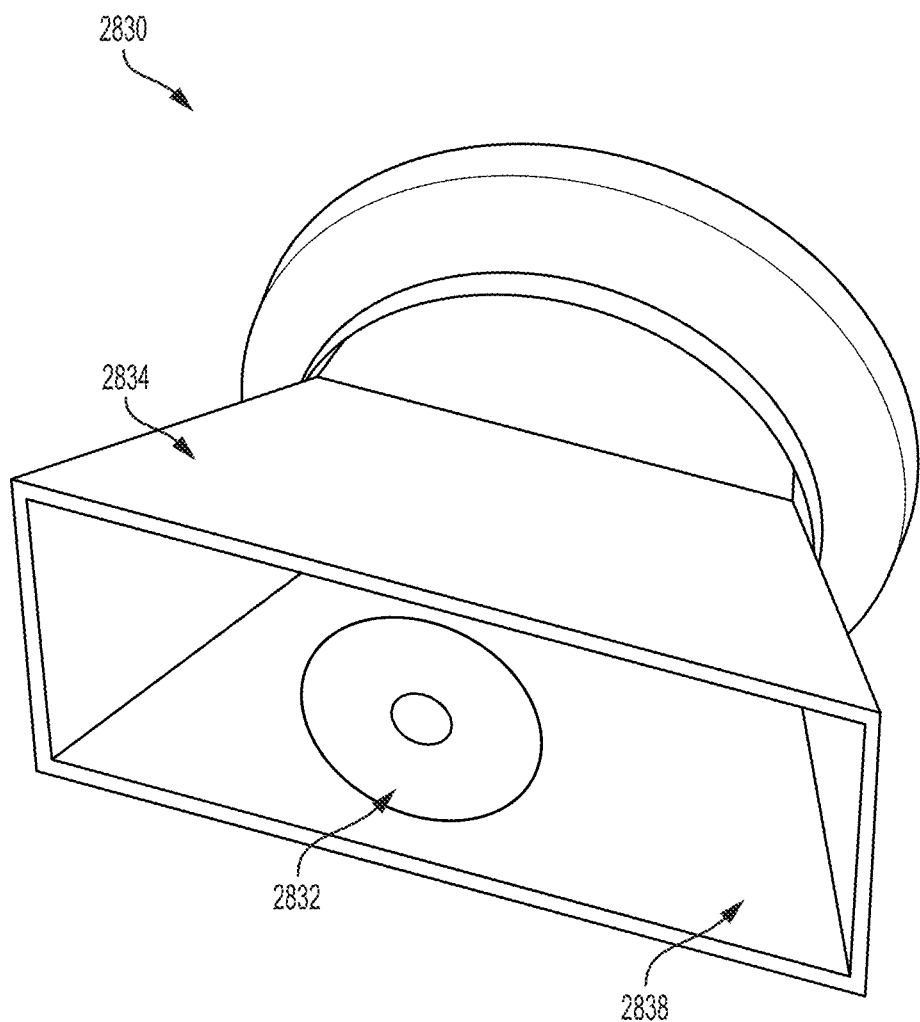
FIG. 28D is an illustration of an example embodiment of an integrated speaker-light component including an angular horn.

As shown in FIG. 28D, in some embodiments, a horn 2834 with a rectangular-shaped mouth 2838 may be used to provide asymmetric pattern dispersion while integrating with a single lighting module 2832. The rectangular-mouthed horn 2834, for example, may install snugly in the flat-faced PSU while providing appropriate asymmetrical distribution to distribute sound to a row grouping of passengers, such as two or three consecutively seated passengers beneath the PSU. This configuration, for example, may be beneficial where a single integrated speaker lighting unit is installed within the PSU adjacent one or more LED lighting modules rather than designing each lighting module as an integrated speaker and lighting unit.

"Horn tuning" can be used to directivity and sound pressure level (SPL) in the upper-mid to high frequency range (5 k-20 k Hz) which improves intelligibility within the audible range. Free air architecture allows the PSU to act as an enclosure for low frequency extension. Further tuning can be accomplished via the offloaded amplifier circuit for enhancing audio perception.

Figure 31:
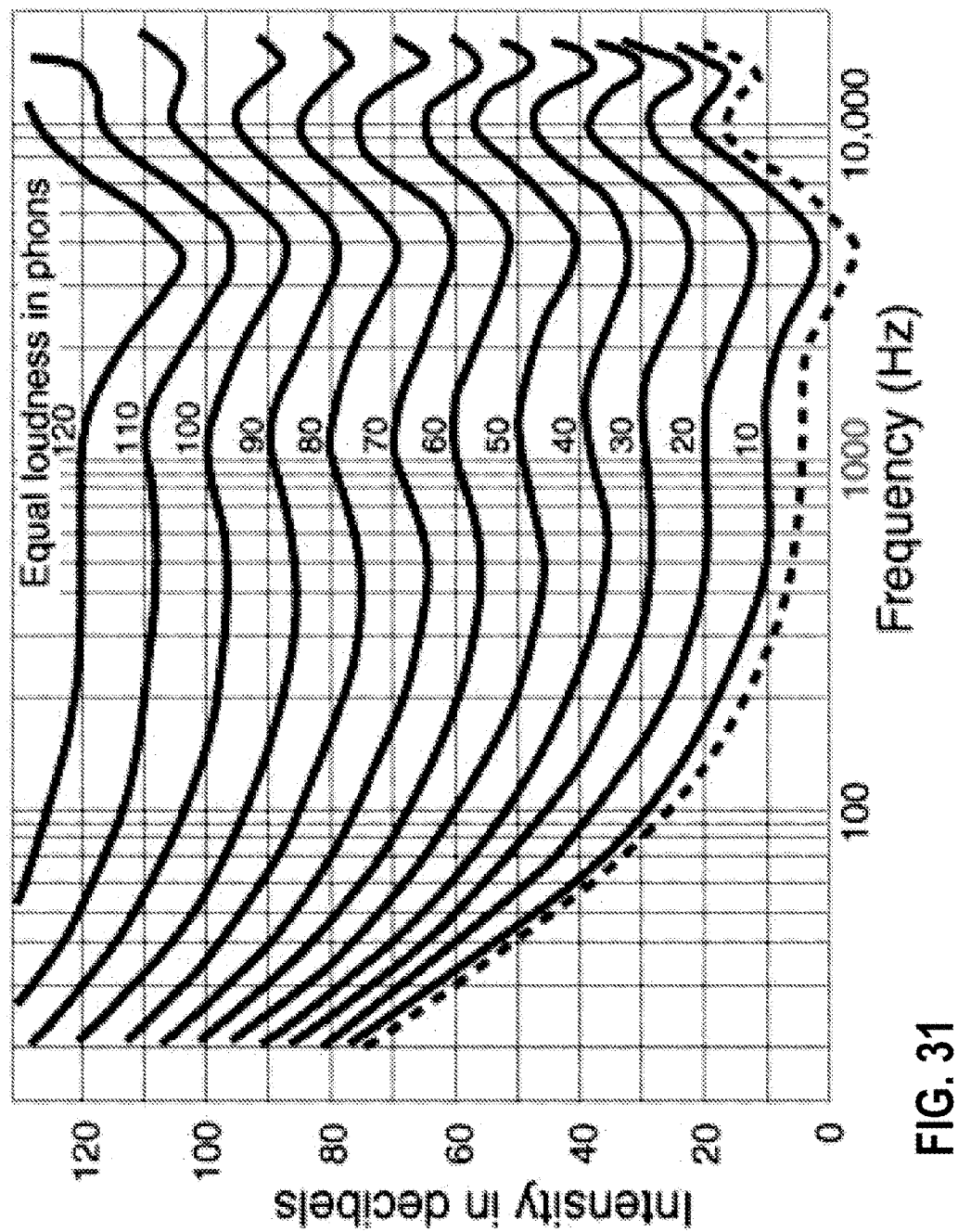
FIG. 31 is a graph illustrating frequency response curves at different equal loudness levels.

Performance of this new approach surpasses existing PSU speaker technology since legacy products are not designed to produce comparable high frequency response characteristics and have to be played at higher SPL levels to achieve similar performance. Other advantages include the application, in certain embodiments, of a slight notch filter in the mid frequency range (−2 k-5 k Hz), included as part of the control circuitry. The notch filter, for example, addresses a "voice squawk" that is often discomforting to passengers. As illustrated in FIG. 31, for example, a set of Fletcher-Munson Curves, also known as the "equal-loudness contours", demonstrate reactions of the human ear to different frequencies, causing some frequencies to sound louder than others. This phenomenon was first discussed in a paper entitled "Loudness, its Definition, Measurement, and Calculation" published in the Journal of the Acoustic Society of America in 1933. In filtering the audio input to adjust for these "louder" frequencies, for example, "voice squawk" may be subdued.

Thus, this integrated design is advantageous in that it is weight neutral with respect to existing task/reading lights, and creates an overall net weight reduction per PSU due to elimination of the PSU speaker. The speaker provides a superior sound quality, directivity, control, and minimization of distortion. Through the use of tunable sound filters designed in embodiments of the control circuitry, click/pop suppression and soft clipping can be provided in either analog or digital form. The speaker may not be required for all task/reading lights and/or PSU panels. In one embodiment, alternating assemblies can be utilized which may lead to further ship set weight savings. The vertically integrated task light and speaker may be used with any of the proposed architectures discussed above.

Further, although described in relation to a PSU, in other embodiments, an integrated speaker and lighting unit in accordance with the teachings above may be built into other aircraft components such as, in some examples, a passenger seat, a passenger suite entertainment unit, a lavatory monument, or a galley monument. Wherever a traditional speaker is currently utilized to distribute in-cabin announcements and lighting, in other words, the integrated speaker and lighting unit may be employed to decrease weight, reduce volume footprint, and improve sound quality. In a particular example, an integrated speaker and lighting unit may be mounted within or proximate to a passenger seat back (e.g., above a shoulder position) to provide a reading lamp functionality. In another example, an integrated speaker and lighting unit may be provided as over counter or vanity mirror lighting in a lavatory monument to provide audio feed of aircraft cabin announcements to passengers within.

Centralized Rib or Group Architecture

FIG. 32 illustrates a centralized rib or group architecture that utilizes a centralized power and control system outside of each SU. This approach leverages the same technologies and applicable features and benefits of the architectures described above. Additionally, this architecture offers even more synergy and possible part count reduction by eliminating redundant circuitry via offloading the power/logic module 140 to a separate assembly that feeds a group of PSU's 130. Costs can be potentially lowered by a reduction in overall 115 VAC, 400 Hz shipside power supply count/capacity that typically require a larger front end for power factor correction and harmonic distortion reduction. This has traditionally been a major cost/weight driver for individual power supplies. The architecture is scalable and may be integrated into existing aircraft subsystems.

The lighting elements may be individual LRUs and are either vertically integrated LED based components or are LED driven fiber optic end nodes that can also be designed in a modular fashion thus enabling increased commonality and flexibility. For instance, fiber optic/light pipes and associated driver engines can be utilized to transmit light to task/reading, ordinance, call lights, etc. This offloads all LED's and their associated electronics/heat sources to a single LRU. This multiplexed light engine could have its own passive thermal management and power supply with multiple collimated fiber outputs that can have a range of several feet. Reliability is enhanced by virtue of commonality and reduced part numbers/count. Power and control to this LRU is a single feed for multiple SU's. Communications may be daisy chained via a TIA-485 architecture or a similar multi-drop topology.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An integrated speaker-light unit for use in an aircraft, comprising:
    a base member adapted to be mounted to a fixture of the aircraft;
    a speaker unit disposed proximate the base member;
    a horn element having a proximal end, a distal end, the proximal end positioned proximate the speaker unit and defining a first aperture, and the distal end defining a second aperture, wherein the first aperture is smaller than the second aperture, and wherein the horn element includes an interior space between the first aperture and the second aperture;
    an LED unit disposed at least partially in the interior space of the horn element; and a housing element at least partially surrounding the horn element;

wherein the second aperture has a width and length, both less than 4 inches;

wherein the housing element is articulably connected to the base member.

2. The integrated speaker-light unit of claim 1, further comprising a flexible printed circuit board comprising control circuitry for controlling the speaker unit and the LED unit.

3. The integrated speaker-light unit of claim 2, wherein the flexible circuit board comprises at least one flexible connector connecting at least one LED of the LED unit to the flexible printed circuit board, wherein the flexible connector is disposed in part within the horn element.

4. The integrated speaker-light unit of claim 1, wherein the second aperture is elongated.

5. The integrated speaker-light unit of claim 4, wherein the LED unit comprises a plurality of LEDs.

6. The integrated speaker-light unit of claim 1, wherein the integrated speaker-light unit is designed for use as a reading light.

7. The integrated speaker-light unit of claim 1, wherein the base member is mounted to a passenger service unit disposed underneath an overhead bin.

8. The integrated speaker-light unit of claim 1, wherein the horn element is an asymmetric speaker horn.

9. An integrated speaker-light unit for use in an aircraft, comprising:
   a base member adapted to be mounted to a fixture of the aircraft;
   a speaker unit disposed proximate the base member unit;
   a horn element having a proximal end, a distal end, the proximal end positioned proximate the speaker unit and defining a first aperture, and the distal end defining a second aperture, wherein the first aperture is smaller than the second aperture, and wherein the horn element includes an interior space between the first aperture and the second aperture;
   an LED unit disposed at least partially in the interior space of the horn element; and
   a housing element at least partially surrounding the horn element;
   wherein the second aperture has a width and length, both less than 4 inches;
   wherein at least a portion of the housing element is adapted to be gripped and articulated by a passenger or crew member.

10. A passenger service unit for an aircraft cabin, comprising:
   an oxygen supply module comprising an oxygen canister and a plurality of oxygen masks;
   a lighting module comprising a plurality of LED reading light units;
   at least one mini-speaker comprising a horn element having a greatest diameter of no greater than four inches; and
   control circuitry for controlling the oxygen supply module, the lighting module, and the at least one mini-speaker, wherein the control circuitry is connected to
      a single power converter for converting an external power supply to voltage usable by the control circuitry, and
      a single communications interface for communicating with an external management computing system,
   wherein the control circuitry and a plurality of LED lights for illuminating the plurality of LED reading light units are disposed on a single contiguous flexible printed circuit board.

11. The passenger service unit of claim 10, wherein a first mini-speaker of the at least one mini-speaker is integrated into a first LED reading light unit of the plurality of LED reading light units, wherein an LED for illuminating the first LED reading light unit is at least partially disposed in the horn element of the first mini-speaker.

12. The passenger service unit of claim 11, wherein the at least one mini-speaker comprises three mini-speakers each integrated with a respective reading light.

13. The passenger service unit of claim 12, wherein a sound output of the three mini-speakers is configured for delivery of enhanced combined sound quality to a corresponding three passenger seats positioned beneath the passenger service unit.

14. The passenger service unit of claim 11, wherein a sound output of the first mini-speaker is directionally optimized to direct sound to a passenger positioned to use the first LED reading light unit.

15. The passenger service unit of claim 10, wherein the passenger service unit weighs at least two pounds less than a corresponding conventional passenger service unit comprising conventional electric bulb reading light units and a conventional paper cone speaker.

16. The passenger service unit of claim 10, wherein the control circuitry further comprises audio control circuitry for providing an audio signal to the at least one mini-speaker, the audio control circuitry including an amplifier and at least one audio filter.

17. The passenger service unit of claim 16, wherein the audio control circuitry further comprises circuitry for applying noise cancellation to the audio signal.

18. The passenger service unit of claim 10, further comprising an ambient noise receiver, wherein noise cancellation is applied based in part on an ambient noise signal from the ambient noise receiver.

* * * * *